US 8,418,054 B2

(12) United States Patent
Ikegami

(10) Patent No.: US 8,418,054 B2
(45) Date of Patent: Apr. 9, 2013

(54) WEB CONTENT READ INFORMATION DISPLAY DEVICE, METHOD, AND PROGRAM

(75) Inventor: Teruya Ikegami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/295,543

(22) PCT Filed: Mar. 27, 2007

(86) PCT No.: PCT/JP2007/056292
§ 371 (c)(1),
(2), (4) Date: Sep. 30, 2008

(87) PCT Pub. No.: WO2007/116705
PCT Pub. Date: Oct. 18, 2007

(65) Prior Publication Data
US 2009/0164887 A1    Jun. 25, 2009

(30) Foreign Application Priority Data
Mar. 31, 2006    (JP) .................................. 2006-097285

(51) Int. Cl.
*G06F 17/00* (2006.01)
*G06F 3/00* (2006.01)
(52) U.S. Cl. ....................................... 715/234; 715/725
(58) Field of Classification Search ................... 715/247, 715/200, 234, 725
See application file for complete search history.

(56) References Cited

U.S. PATENT DOCUMENTS

| 6,211,856 | B1 * | 4/2001  | Choi et al. ...................  345/666 |
| 6,304,271 | B1 * | 10/2001 | Nehme ........................  345/620 |
| 7,345,688 | B2 * | 3/2008  | Baudisch et al. .............  345/467 |
| 7,418,673 | B2 * | 8/2008  | Oh ..............................  715/838 |
| 7,716,605 | B2 * | 5/2010  | Oh ..............................  715/838 |
| 8,051,388 | B2 * | 11/2011 | Toki ............................  715/838 |
| 2004/0196298 | A1 * | 10/2004 | Nagahashi et al. ..........  345/619 |
| 2006/0064647 | A1 * | 3/2006  | Tapuska et al. ..............  715/800 |
| 2006/0072847 | A1 * | 4/2006  | Chor et al. ..................  382/282 |

(Continued)

FOREIGN PATENT DOCUMENTS

| JP | 2000099232 A | 4/2000 |
| JP | 2000112856 A | 4/2000 |

(Continued)

OTHER PUBLICATIONS

Bongwon et al., Automatic Thumbnail Cropping and its Effectiveness, 2003, CiteSeer, pp. 1-10.*

(Continued)

*Primary Examiner* — Manglesh M Patel
(74) *Attorney, Agent, or Firm* — Sughrue Mion, PLLC

(57) ABSTRACT

A Web content read information display device includes: a content image generation unit for cutting out a part of at least one Web content based on a past display format according to a predetermined rule so as to generate a thumbnail and generate at least one trimming image from a part of the Web content displayed in the past; a read history screen generation unit for displaying a read history screen where the thumbnail and the trimming image corresponding to each of the Web contents are arranged on a display device; and a content read operation control unit for displaying a Web content corresponding to read operation information indicating one of the thumbnail images and one of the trimming images displayed, on the display device.

22 Claims, 29 Drawing Sheets

U.S. PATENT DOCUMENTS

| | | | |
|---|---|---|---|
| 2006/0139371 A1* | 6/2006 | Lavine et al. | 345/620 |
| 2007/0106952 A1* | 5/2007 | Matas et al. | 715/764 |
| 2008/0134093 A1* | 6/2008 | Dharmarajan et al. | 715/838 |
| 2008/0294974 A1* | 11/2008 | Nurmi et al. | 715/204 |
| 2010/0073402 A1* | 3/2010 | Delia et al. | 345/625 |
| 2010/0232504 A1* | 9/2010 | Feng | 375/240.13 |
| 2011/0007180 A1* | 1/2011 | Sato | 348/222.1 |
| 2011/0019239 A1* | 1/2011 | Kojima et al. | 358/401 |
| 2011/0273466 A1* | 11/2011 | Imai et al. | 345/589 |

FOREIGN PATENT DOCUMENTS

| | | | |
|---|---|---|---|
| JP | 200273684 A | 3/2002 | |
| JP | 2002251338 A | 9/2002 | |
| JP | 2002281506 A | 9/2002 | |
| JP | 2003330856 A | 11/2003 | |
| JP | 2004030145 A | 1/2004 | |
| JP | 2004038495 A | 2/2004 | |

OTHER PUBLICATIONS

Ryo Ohsawa et al., Data History Search Framework that use Relation Value between Data and Attention Value of Data based on User Behavior, Faculty of Environmental Information et al., Keio University, 99th Information Processing Study of Japan, system software and Operating system research group, 8 pages, 2005.

Mark Tarquin et al, Extensible Rendering Architecture (ERA), Opera Software, 2005.

* cited by examiner

WEB CONTENT READ INFORMATION DISPLAY DEVICE, METHOD, AND PROGRAM

TECHNICAL FIELD/BACKGROUND OF THE INVENTION

The present invention relates to Web content read techniques, in particular, to a Web content read method and the like on a portable telephone and in a TV/remote controller environment.

BACKGROUND ART

It has already been popular to read content (hereinafter written as "Web content") provided through WWW (World Wide Web) under a personal computer (hereinafter written as "PC") environment equipped with a pointing device such as a mouse and a character input device such as a keyboard as input apparatus.

As a first traditional art, a Web browser for PCs of the traditional art such as Internet Explorer (hereinafter written as "IE") provided by Microsoft Co. is equipped with a function which enables a user to reference a Web content the user had read in the past as a history, and to re-access the Web content. In the IE, Web content title and URL information are presented as history information, and the switching of display mode (grouping, sort) according to the URL (Uniform Resource Locator) of the same domain, read date and time, number of times, order, and the like is realized to provide a method which enables a user to search a Web content as easy as possible.

As a second traditional art, image information registered by the user is added to bookmark information of only the URL and the Web content title to enhance the expressiveness in a document display device described in patent document 1.

As a third traditional art, the search result is sorted and displayed according to degrees of attention and association of the user on the data calculated based on user operation such as number of accesses, number of selected character string inversion, absence of input for a long period of time (check whether out of desk), and the like in a history search mechanism described in non-patent document 1.

As a fourth traditional art, in Extensible Rendering Architecture (ERA) available from Opera Co., and a browser system and a method of controlling the same described in patent document 2, the Web content originally created to be read under the PC environment is subjected to Web shaping/conversion process such as adjustment of image size used in the original Web content, change/delete of tag, division to a plurality of Web pages, creation of index page and the like so as to be referenced on the portable telephone or the TV/remote controller environment, and then displayed on a client terminal.

Patent document 1: Japanese Laid-Open Patent Publication No. 2002-251338
Patent document 2: Japanese Laid-Open Patent Publication No. 2003-330856
Non-patent document 1: Data History Search Framework that use Relation Value between Data and Attention Value of Data based on User Behavior, Faculty of Environmental Information, Keio University, 99th Information Processing Study of Japan, system software and Operating system research group.

DISCLOSURE OF INVENTION

Problems to be Solved by the Invention

In recent years, there has been a trend to diffuse the reading of Web contents in a wider group and generate a new Web service cooperating with TV viewing by providing a device which enables Web content reading under an environment same as the viewing of television programs (hereinafter written as "TV viewing").

However, under the environment using a television receiver and a remote controller to operate the same (hereinafter written as "TV/remote controller environment"), the resolution of the display is lowered and the viewing distance tends to become longer compared to the Web reading using PC of the traditional art, and thus the character size etc. need to be maintained to a certain size of greater in order to be read without problem, and as a result, the information amount that can be displayed on the display in one time decreases.

Furthermore, compared to the case of using an input apparatus such as mouse and keyboard, fine pointing operation is difficult by using the remote controller, whereby the input efficiency of characters lowers.

When attempting to introduce the general Web reading method using PC to the Web reading under the TV/remote controller environment, various problems arise mainly from the standpoint of efficiency and understandability.

The first problem is that when the user desires to read the Web content referenced in the past again by tracking back the read history, it is difficult to select the desired Web content since the information attached to the Web content is only text information such as URL and Web content title.

The reason is that, with only the text information such as URL and title, the expressiveness is insufficient for the user to select the desired Web content. In particular, when the relevant site is read, the titles and the URLs whose first half parts are the same are displayed in a list, and discrimination between them becomes difficult. Furthermore, in the environment of portable telephone and TV viewing, a large display region is occupied by simply displaying the text information such as URLs and titles in a list, and thus it becomes difficult to adopt a two-screen configuration of displaying the read history on the left of the screen and displaying the selected Web content on the right of the screen as seen in browsers for PC, and the operation to select the Web content appropriately and check the actual Web content may not be efficiently realized.

The second problem is that when enhancing the expressiveness by associating the icon images, pictures, and the like to the Web content, the trouble of registration by the user arises in reading.

Furthermore, when a thumbnail image which is obtained by reducing the size of the entire read Web content is presented, though the configuration and the atmosphere of the entire Web content can be identified, it is difficult to distinguish the Web content having the same design such as the Web content of the same site. Furthermore, the thumbnail image may not function for the original purpose of identifying not only the text but also the atmosphere of the entire content with respect to the Web content that tends to have a configuration extremely long vertically such as bulletin board and blog, which are recently increasing.

The reason is that there is no mechanism equipped for automatically acquiring the image information to be associated to the Web content at reading time. Even if the mechanism for acquiring the thumbnail image of the entire Web content as image information to be associated to the Web content is arranged, the text is unreadable since the size is reduced and the detailed content cannot be understood with the display of only the thumbnail image.

The third problem is that the operation of tracking back the history displayed in a list is inefficient on the remote controller and the portable telephone not equipped with a measure of direct pointing. The efficiency may slightly enhance by performing the sorting and grouping process using information attached to the Web content such as read date and time, name of title, and domain, but the operation may become complicating.

The reason is that the remote controller and the portable telephone generally include buttons for basic operations only such as cursor movement in upward, downward, leftward, and rightward directions, decision, and cancel, and it may not always be possible to separately arrange a button for efficiently performing cursor movement. Furthermore, when the sorting and grouping functions are provided, operations such as the switching of sort order, the selection of group, and the hierarchical movement are separately required.

The fourth problem is that it is sometimes difficult to track back to the content referenced in the past with the bookmark registered content as the starting point.

The reason is that, though the user normally registers the top pages of bulletin board and blog with the bookmark, not many users register the bookmark for all the contents in which each article is described, thus when the user desires to again look at some article at a later date, if the user remembers the content of the article to a certain extent, may be confused with the memory of where the user saw the article and how the user arrived at the article.

The fifth problem is that when converting the Web content and referencing the same on the portable telephone or in the TV/remote controller environment, it is difficult to discriminate the content of each converted (divided) Web content. When desiring to reference the converted Web content referenced in the past again from the read history, the trouble of again accessing the original Web content arises.

The reason is that each converted (divided) Web content has images whose sizes are reduced and the number of images is small compared to the original Web content, and the percentage of the text information in the screen tends to increase, and thus it becomes difficult to discriminate the content from the outer appearance. In a general Web content conversion, it is not supposed to handle the read history about each divided Web content, and a measure for the user to specify the target information (divided single Web content configuring the original Web content) from the read history is not arranged.

The sixth problem is that when performing the conversion process of the Web content in a server, it is possible that a standby time and communication charge unnecessary for the user arise.

The reason is that, when the Web content is accessed, the communication process including information unnecessary for the user (information contained in the original Web content, but not referenced by the user) becomes necessary.

It is an object of the present invention to provide a method etc. enabling the user to easily select the desired Web content based on a read history under a poor environment with respect to an information amount which can be displayed on a display and a function of input device as compared to the PC, such as the portable telephone and the TV/remote controller.

Means for Solving the Problem

A Web content read information display device of the present invention includes a content image generation unit for cutting out a part of at least one Web content based on a past display format according to a predetermined rule so as to generate a thumbnail and generate at least one trimming image from a part of the Web content displayed in the past; a read history screen generation unit for displaying a read history screen where the thumbnail image and the trimming image corresponding to each of the Web contents are arranged on a display device; and a content read operation control unit for displaying a Web content corresponding to read operation information indicating one of the thumbnail images and one of the trimming images displayed, on the display.

According to the Web content read information display device, the content image generation unit generates and saves the thumbnail image obtained by cutting out only the portion actually seen by the user and reducing the size, and the trimming image obtained by cutting out the portion the user read for a long period of time or the portion pushed with the link based on the operation of reading the Web content of the user, and the read history screen generation unit presents the read history information screen arranging the thumbnail image and the trimming image when referencing the read history at a later data.

Thus, the Web content desired by the user can be selected while referencing the thumbnail image from which the configuration and the atmosphere of the entire region actually read by the user in the Web content can be grasped, and the trimming image enabling one part of the region assumed to be intentionally read particularly by the user to be checked in the environment (mainly size of text) same as when the user normally reads the Web content in addition to the basic information of title, URL, and read date and time.

In the Web content read information display device, the content image generation unit may analyze a layout configuration of the Web content, divide the Web content into a plurality of blocks, and correct a region from which the thumbnail image and the trimming image are cut out according to a boundary of each block.

In the Web content read information display device, the read history screen generation unit may generate an omitted title in which a portion common to titles of the Web contents belonging to a same group is omitted, and arrange the omitted title in the read history screen.

With this, when the character string of one part of the title is common in the same content group, display is made with the common portion omitted, so that unnecessary information are eliminated and the viewability is enhanced when plural Web contents in the same site such as blog and bulletin board, with which the head portions of the titles are the common, had been read under an environment the limitation of the display region is particularly strict.

In the Web content read information display device, the read history screen generation unit may display the Web content corresponding to the read operation information according to a past read path by arranging the title, an icon image, the thumbnail image, or the trimming image indicating the Web content on a read path on the read history screen.

With this, by allowing the read path of each Web content to be presented and selected while checking the Web contents refined by read period and URL domain, the user is supported to remember the circumstances under which the user came to read the relevant content, and the user can move to the Web content belonging to another group by tracking back the read path without returning to the group selection even if mistaking the initial group selection (refinement).

In particular, when reading the blog, the bulletin board, or the news site dealing with the articles of a common content by tracking back the link, it can be expected that the desired Web content can be reached if one Web content dealing with a related article is found, by tracking back the read path therefrom when the user doesn't remember the accurate title, read period, and the content group (site) to which it belongs when searching for a specific Web content dealing with the relevant content.

In the Web content read information display device, the read history screen generation unit may arrange a title or a thumbnail image of the Web content registered in a bookmark on the read history screen, where if a Web content corresponding to the selected one had been read in the past, the title, the thumbnail image, or the trimming image of the Web content belonging to the group same as the Web content is arranged on the read history screen.

With this, the bookmark-registered Web contents can be selected while checking the thumbnail images, and in addition, the read history can be directly selected to move to the corresponding Web content by also presenting and selecting the read history related to the Web content being selected.

As a result, the trouble of selecting the bookmark-registered Web content and tracking back to the desired page while recalling the memory of the past is alleviated.

In the Web content read information display device, the content image generation unit may generate, from an index page indicating a list of divided pages obtained by dividing a converted content of the Web content into a plurality of pages, a converted thumbnail image, a converted trimming image, and a block image in which a portion including a region corresponding to each divided page in the index page is cut out according to a correspondence relationship of the index page and the divided page; the content read operation control unit may arrange the converted thumbnail image, the converted trimming image, and information indicating that the trimming image is an image generated from the converted Web content on the read history screen in place of the thumbnail image and the trimming image, and display a block selection screen where the converted thumbnail image corresponding to the read operation information and the block image corresponding to the converted thumbnail image are arranged on the display device; and the read operation control unit may display the divided page corresponding to the block image selected in the block selection screen on the display device.

With this, the user can eliminate the trouble of tracking back the index page at reading time to select the divided page by directly selecting information (divided page) of one part in the Web content desired by the user on the page block selection screen.

In the Web content read information display device, the content image generation unit may acquire the content image generation unit may acquire the converted content from an external device via a network.

With this, the amount of communication data transferred between the content read information display device and the external device for performing content conversion is thereby reduced, and the user can reach to the desired information with lesser standby time.

A web content read information display method of the present invention includes the steps of: a content image generation step of cutting out a part of at least one Web content based on a past display format according to a predetermined rule so as to generate a thumbnail and generate at least one trimming image from a part of the Web content displayed in the past; a read history screen generation step of displaying a read history screen where the thumbnail image and the trimming image corresponding to each of the Web contents are arranged on a display device; and a content read operation control step of displaying a Web content corresponding to read operation information indicating one of the thumbnail images and one of the trimming images displayed, on the display device.

According to the Web content read information display method described above, in the content image generation step, the thumbnail image obtained by cutting out only the portion actually seen by the user and reducing the size, and the trimming image obtained by cutting out the portion the user read for a long period of time or the portion pushed with the link are generated and saved from the operation of the user at reading the Web content, and in the read history screen generation step, the read history information screen arranging the thumbnail image and the trimming image is presented when referencing the read history at a later data.

Thus, the Web content desired by the user can be selected while referencing the thumbnail image from which the configuration and the atmosphere of the entire region actually read by the user in the Web content can be grasped, and the trimming image enabling one part of the region assumed to be intentionally read particularly by the user to be checked in the environment (mainly size of text) same as when the user normally reads the Web content in addition to the basic information of title, URL, and read date and time.

In the Web content read information display method, in the content image generation step, a layout configuration of the Web content may be analyzed, the Web content may be divided into a plurality of blocks, and a region from which the thumbnail image and the trimming image are cut out may be corrected according to a boundary of each block.

With this, the content can be more easily grasped by the user from the thumbnail image and the trimming image.

In the Web content read information display method, in the read history screen generation step, an omitted title in which a portion common to titles of the Web contents belonging to a same group is omitted may be generated, and the omitted title may be arranged in the read history screen.

With this, when the character string of one part of the title is common in the same content group, display is made with the common portion omitted, so that unnecessary information are eliminated and the viewability is enhanced when reading plural Web contents in which the head portion in the same site such as blog and bulletin board is the common title under an environment the limitation of the display region is particularly strict.

In the Web content read information display method, in the read history screen generation step, the Web content corresponding to the read operation information may be displayed according to a past read path by arranging the title, an icon image, the thumbnail image, or the trimming image indicating the Web content on a read path on the read history screen.

With this, by allowing the read path of each Web content to be presented and selected while checking the Web contents refined by read period and URL domain, the user is supported to remember the circumstances under which the user came to read the relevant content, and the user can move to the Web content belonging to another group by tracking back the read path without returning to the group selection even if mistaking the initial group selection (refinement).

In particular, when reading the blog, the bulletin board, or the news site dealing with the articles of a common content by tracking back the link, it can be expected that the desired Web content can be reached if one Web content dealing with a related article is found, by tracking back the read path therefrom when the user doesn't remember the accurate title, read period, and the content group (site) to which it belongs when searching for a specific Web content dealing with the relevant content.

In the Web content read information display method, the read history screen generation unit may arrange a title or a thumbnail image of the Web content registered in a bookmark on the read history screen, where if a Web content corresponding to the selected one had been read in the past, the title, the thumbnail image, or the trimming image of the Web content belonging to the group same as the Web content is arranged on the read history screen.

With this, the bookmark-registered Web contents can be selected while checking the thumbnail images, and in addition, the read history can be directly selected to move to the corresponding Web content by also presenting and selecting the read history related to the Web content being selected.

As a result, the trouble of selecting the bookmark-registered Web content and tracking back to the desired page while recalling the memory of the past is alleviated.

In the Web content read information display method, in the content image generation step, from an index page indicating a list of divided pages obtained by dividing a converted content of the Web content into a plurality of pages, a converted thumbnail image, a converted trimming image, and a block image in which a portion including a region corresponding to each divided page in the index page is cut out according to a correspondence relationship of the index page and the divided page may be generated; in the content read operation control step, the converted thumbnail image, the converted trimming image, and information indicating that the trimming image is an image generated from the converted Web content may be arranged on the read history screen in place of the thumbnail image and the trimming image, and a block selection screen where the converted thumbnail image corresponding to the read operation information and the block image corresponding to the converted thumbnail image are arranged may be displayed on the display device; and in the read operation control step, the divided page corresponding to the block image selected in the block selection screen may be displayed on the display device.

With this, the user can eliminate the trouble of tracking back the index page at reading time to select the divided page by directly selecting information (divided page) of one part in the Web content desired by the user on the page block selection screen.

In the Web content read information display method, in the content image generation step, the converted content may be acquired from an external device via a network.

With this, the amount of communication data transferred between the content read information display device and the external device for performing content conversion is thereby reduced, and the user can reach to the desired information with lesser standby time.

A Web content read information display program of the present invention is a Web content read information display program for causing a computer to execute a process of displaying externally input Web contents on a display device; the Web content read information display program causing the computer to execute content image generation process of cutting out a part of at least one Web content based on a past display format according to a predetermined rule so as to generate a thumbnail and generate at least one trimming image from a part of the Web content displayed in the past; read history screen generation process of displaying a read history screen where the thumbnail image and the trimming image corresponding to each of the Web contents are arranged on a display device; and content read operation control process of displaying a Web content corresponding to read operation information indicating one of the thumbnail images and one of the trimming images displayed, on the display device (claims 15 to 21).

According to the Web content read information display program described above, the thumbnail image obtained by cutting out only the portion actually seen by the user and reducing the size, and the trimming image obtained by cutting out the portion the user read for a long period of time or the portion pushed with the link are generated and saved bases on the operation of the user at reading the Web content by the content image generation function, and the read history information screen arranging them is presented when referencing the read history at a later data by the read history screen generation function.

Thus, the Web content desired by the user can be selected while referencing the thumbnail image from which the configuration and the atmosphere of the entire region actually read by the user in the Web content can be grasped, and the trimming image enabling one part of the region assumed to be intentionally read particularly by the user to be checked in the environment (mainly size of text) same as when the user normally reads the Web content in addition to the basic information of title, URL, and read date and time.

In the Web content read information display program, in the content image generation process, a layout configuration of the Web content may be analyzed, the Web content may be divided into a plurality of blocks, and a region from which the thumbnail image and the trimming image are cut out may be corrected according to a boundary of each block.

In the Web content read information display program, in the read history screen generation process, an omitted title in which a portion common to titles of the Web contents belonging to a same group is omitted may be generated, and the omitted title may be arranged in the read history screen.

With this, when the character string of one part of the title is common in the same content group, display is made with the common portion omitted, so that unnecessary information are eliminated and the viewability is enhanced when reading plural Web contents in which the head portion in the same site such as blog and bulletin board is the common title under an environment the limitation of the display region is particularly strict.

In the Web content read information display program, in the read history screen generation step, the Web content corresponding to the read operation information may be displayed according to a past read path by arranging the title, an icon image, the thumbnail image, or the trimming image indicating the Web content on a read path on the read history screen.

With this, by allowing the read path of each Web content to be presented and selected while checking the Web contents refined by read period and URL domain, the user is supported to remember the circumstances under which the user came to read the relevant content, and the user can move to the Web content belonging to another group by tracking back the read path without returning to the group selection even if mistaking the initial group selection (refinement).

In particular, when reading the blog, the bulletin board or the news site dealing with the articles of a common content by tracking back the link, it can be expected that the desired Web content can be reached if one Web content dealing with a related article is found, by tracking back the read path therefrom when the user doesn't remember the accurate title, read period, and the content group (site) to which it belongs when searching for a specific Web content dealing with the relevant content.

In the Web content read information display program, n the read history screen generation process, a title or a thumbnail image of the Web content registered in a bookmark may be arranged on the read history screen, where if a Web content corresponding to the selected one had been read in the past, the title, the thumbnail image, or the trimming image of a Web content belonging to the group same as the Web content is arranged on the read history screen.

With this, the bookmark-registered Web contents can be selected while checking the thumbnail images, and in addition, the read history can be directly selected to move to the corresponding Web content by also presenting and selecting the read history related to the Web content being selected.

As a result, the trouble of selecting the bookmark-registered Web content and tracking back to the desired page while recalling the memory of the past is alleviated.

In the Web content read information display program, in the content image generation process, from an index page indicating a list of divided pages obtained by dividing a converted content of the Web content into a plurality of pages, a converted thumbnail image, a converted trimming image, and a block image in which a portion including a region corresponding to each divided page in the index page is cut out according to a correspondence relationship of the index page and the divided page may be generated; in the content read operation control process, the converted thumbnail image, the converted trimming image, and information indicating that the trimming image is an image generated from the converted Web content may be arranged on the read history screen in place of the thumbnail image and the trimming image, and a block selection screen where the converted thumbnail image corresponding to the read operation information and the block image corresponding to the converted thumbnail image are arranged may be displayed on the display device; and in the read operation control process, the divided page corresponding to the block image selected in the block selection screen may be displayed on the display device.

With this, the user can eliminate the trouble of tracking back the index page at reading time to select the divided page by directly selecting information (divided page) of one part in the Web content desired by the user on the page block selection screen.

In the Web content read information display program, in the content image generation process, the converted content may be acquired from an external device via a network.

With this, the amount of communication data transferred between the content read information display device and the external device for performing content conversion is thereby reduced, and the user can reach to the desired information with lesser standby time.

Advantageous Effect Of The Invention

According to the present invention, the thumbnail image obtained by cutting out only the portion actually seen by the user and reducing the size, and the trimming image obtained by cutting out the portion the user read for a long period of time or the portion pushed with the link are generated and saved based on the operation of reading the Web content of the user, and the read history information screen arranging them is presented when referencing the read history at a later data.

Thus, the Web content desired by the user can be selected while referencing the thumbnail image from which the configuration and the atmosphere of the entire region actually read by the user in the Web content can be grasped, and the trimming image enabling one part of the region assumed to be intentionally read particularly by the user to be checked in the environment (mainly size of text) same as when the user normally reads the Web content in addition to the basic information of title, URL, and read date and time.

BEST MODE FOR CARRYING OUT THE INVENTION

Exemplary embodiments of the invention will now be described in detail with reference to the drawings.

(1) First Exemplary Embodiment

A Web content read information display device 20, which is the first exemplary embodiment of the invention, will be described. The most essential point of the present example is including a read history screen generation unit 5, a read operation acquisition unit 6, and a content image generation unit 7. When the user is reading the Web content, the read operation acquisition unit 6 obtains the operation information of the user about the Web content reading, the content image generation unit 7 generates a thumbnail image of the Web page the user is reading and a trimming image in which a region known by analogy that the user is paying particular attention is extracted, and saves them in a read history information storage unit 8 along with read operation information. When the user references the read history thereafter, the read history screen generation unit 5 references the read history information held by the read history storage unit 8, and generates a read history screen enabling the thumbnail image and the trimming image of the content referenced in the past to be referenced.

A configuration view of the Web content read information display device 20 is shown in FIG. 1.

The Web content read information display device 20 is a television receiver and the like, and includes an input device 1, an output device 2, a content read operation control unit 3, a network communication unit 4, the read history screen generation unit 5, the read operation acquisition unit 6, the content image generation unit 7, and the read history information storage unit 8.

The content read operation control unit 3 receives operation of the user by the input device 1, and outputs information related to the Web content read operation to the network communication unit 4 and the read operation acquisition unit 6, information related to the read history reference operation to the read history screen generation unit 5, and rendering information of the content being read to the content image generation unit 7. Furthermore, the content read operation control unit 3 receives the Web content from the network communication unit 4, draws a content read screen and outputs the same to the output device 2. The content read operation control unit 3 further receives screen information generated by the read history screen generation unit 5, draws a read history reference screen, and outputs the same to the output device 2.

The read operation acquisition unit 6 receives the information related to the content read operation from the content read operation control unit 3, acquires in addition to title, URL, read start date and time, and read end date and time, a region (coordinate) displayed on the screen of every defined time (e.g., one second) as read region information, and a position of a link or a button (link object) selected by the user and the link destination URL etc. thereof as link information, and outputs the same to the content image generation unit 7 and the read history information storage unit 8. The read operation acquisition unit 6 references the read history information held by the read history information storage unit 8, searches for the read history information related to the Web content currently being read, acquires the read region information in the Web content read history, and outputs the same to the content image generation unit 7.

The content image generation unit 7 receives the rendering information from the content read operation control unit 3, and creates and holds an image file of the entire content. Furthermore, the content image generation unit 7 receives the read region information and the link information from the read operation acquisition unit 6, determines a portion to cutout according to the read region from the image of the entire content, generates a thumbnail image obtained by reducing the size of the cutout rectangular region, and outputs the same to the history information storage unit 8. Furthermore, the content image generation unit 7 determines an attention region in the content according to the read region information and the link information, generates the trimming image in which a portion including the attention region is cutout from the image of the entire content, and outputs the same to the read history information storage unit 8.

The read history information storage unit 8 is configured by a non-transitory computer readable recording medium such as a hard disc device and the like, and associates and holds the title, the URL, the read start/end date and time information from the read operation acquisition unit 6, and the thumbnail image and the trimming image with respect to the same content received from the content image generation unit 7 together.

The read history screen generation unit 5 receives the information related to the read history reference operation from the content read operation control unit 3, references the read history information held by the read history information storage unit 8, arranges an icon image representing the read content grouped according to domain etc. of the URL or the thumbnail image of an arbitrary content of the same site horizontally or vertically according to the read date and time and frequency, and arranges a list of titles showing each content of the same site or the thumbnail image or the trimming image in the other axial direction, thereby generating a read history screen enabling the selection of content in up and down and left and right directions with the remote controller and outputs the same to the content read operation control unit 3.

The input device 1 is, for example, a remote controller for inputting operation instructions by infrared ray, and includes a cross-shaped button and the like for moving the button or the cursor displayed with numbers for selecting channels up and down, and left and right, but there is no function for directly inputting characters such as alphabets.

The output device 2 is, for example, a liquid crystal display device, and the like, and displays Web contents and received television programs as image. The resolution thereof, however, is lower than that of the PC, and in most cases, the image cannot be entirely displayed on one screen if the characters contained in the web content is made to be a size readable by the user.

The network communication unit 4 acquires the Web content from an external device such as the Web server via the Internet 30 by HTTP (HyperText Transfer Protocol), and outputs the same to the content read operation control unit 3.

The configuration view shown in FIG. 1 is a configuration in which a client terminal possessed by the user for Web reading is equipped with all the processing units, but a configuration in which the external server includes the content image generation unit 7, and generates and distributes the thumbnail image and the trimming image enabling the content provider side itself to effectively grasp the Web content provided by the content provider itself may be adopted.

As an operation example of the Web content read information display device 20, the read operation information and the link information acquired by the read operation acquisition unit 6 when the user reads the Web content, the thumbnail/trimming images generated by the content image generation unit 7, and a screen example generated by the read history screen generation unit 5 are illustrated, then the flow of generating the thumbnail image and the content image as well as the read history screen will be described in detail.

FIG. 4 shows an example of the Web content read by the user.

A Web content 1030 has a configuration that is long in the vertical direction as seen particularly in news sites, bulletin boards, blog pages, and the like. When the user reads the Web content 1030, a display region (frame 1040 of FIG. 4) of the display is limited, and the content of the Web content cannot be displayed all at once, and thus the user needs to move the display region using the input device 1 to read forward the content of the Web content.

In this example, it is assumed that the user moves the display region to around the middle (frame 1041) of the Web content, and then after a while, moves the display region downward little by little to advance the reading of the Web content, again moves the display region upward at the point (frame 1042) the desired article is finished, and pushes a link 1043 to move onto another Web content.

The read operation acquisition unit 6 traces the frame movement of the user for every defined time, and calculates a horizontal width Sx and a vertical width Sy from the movement range of the frame when the reading of the relevant Web content is finished (moved onto another content or Web reading itself is terminated). Furthermore, the read operation acquisition unit 6 acquires a coordinate (Tx1, Ty1) at the upper left of the region in which the frame stayed the longest time as an attention coordinate, and a coordinate (Tx2, Ty2) having a link which is pushed when moving onto another Web content as a link coordinate, while the user is reading the relevant content.

The content image generation unit 7 creates and holds the image file of the entire Web content, and then cuts out an image according to the display region width Sx, Sy, from the relevant image, reduces the size to generate a thumbnail image 1050 (FIG. 5), and saves the same in the read history information storage unit 8.

The content image generation unit 7 also cuts out an image according to defined horizontal and vertical widths at the attention coordinate (Tx1, Ty1), generates the trimming image, and saves the same in the read history information storage unit 8 along with the time the frame stayed thereat. In this example, a trimming image 1051 in a relatively small size and a trimming image 1052 in a relatively large size are generated and saved together.

The content image generation unit 7 moreover cuts out an image according to defined horizontal and vertical widths at the link coordinate (Tx2, Ty2), generates a link image 1053, and saves the same in the read history information storage unit 8.

After moving to another Web content, when the user pushes the "return" button of the browser to return to the relevant Web content and again performs reading, the frame movement of the user is traced similar to the example previously described, a horizontal width Sx' and a vertical width Sy' are calculated from the frame movement range, which are respectively compared with the horizontal width Sx and the vertical width Sy, and the larger value is respectively adopted. That is, if Sx'<Sx and Sy'>Sy, the display region width is updated to Sx, Sy'. If display region width is to be updated, the thumbnail image is again generated and overwritten. The attention coordinate and the link coordinate are similarly acquired, and the trimming image is generated and saved in the read history information storage unit 8. With respect to the trimming image, a plurality of trimming images is stored without deleting the previously saved trimming images unless the attention coordinate of the link coordinate completely match.

FIG. 6 shows a screen example generated by the read history screen generation unit 5 when the user references the past read history. In a read history screen 1060, the Web contents assumed to be the contents of the same site are grouped by the URL domain, taking the Web content having the shortest URL domain (assumed as top page), the Web content having the longest read time, and the like as the representative content of the respective content group, and the respective thumbnail images thereof are arranged in the horizontal axis direction.

In this example, the content groups are collected in units of days according to the read date and time of the Web content, and then the thumbnail images are horizontally arranged in the order of titles. In the screen 1060, a thumbnail image 1061 at the center of the screen is being selected, and the title and the URL (rectangle 1062) are presented as information related to the thumbnail image being selected. The user can switch the group of the Web content by the leftward and rightward operation while checking the thumbnail image from which the overall configuration and the atmosphere of the Web content can be grasped.

Furthermore, a trimming image 1063 having the longest frame staying time among the images generated from the attention coordinate is vertically arranged as a trimming image of the Web content read in the past in the group of the Web content being selected. The arrangement order of the Web content (trimming image) complies with the refining conditions of the content group (e.g., suppose "Nov. 30, 2005" is date specified), where the Web contents read on Nov. 30, 2005 are preferentially lined in the order of read time, and then the Web contents (trimming image 1064 etc.) read on dates other than Nov. 30, 2005 are lined in the order of read time, so that selection can be made by the upward and downward operation.

In addition to the basic information such as the title and the URL of the Web content, and the read date and time, the user can search for the desired Web content while checking the trimming image from which the content of one part of the Web content can be grasped. Furthermore, as the user advances the selection of the Web content in the down direction, the Web content that does not correspond to the first refining conditions can be selected and can be checked without the trouble of changing the first refining conditions.

In the present example, the first refining condition of the Web content is the read date specification, but may be read month or read year, titles in alphabetical order, number of accesses, and the like.

FIG. 7 shows another screen example generated by the read history screen generation unit 5.

In a screen 1070, the thumbnail images of the representative Web content of each content group are horizontally arranged, similar to the screen 1060. A list 1071 displaying the Web contents contained in the same content group in a list is displayed as information related to the content group being selected, and the Web content can be selected by the upward and downward operation. In the Web content list 1071, a graph 1072 in which each content is compared relatively with the total time read in the past is presented in addition to the content title. The arrangement order of the Web content complies with the manner of assembling content groups (e.g., suppose "November, 2005" is month specified), where the Web contents read in November, 2005 are preferentially lined in the order of read time, and then the Web contents read on days other than in November, 2005 are lined in the order of longest read total time. The user can check a trimming image 1074 corresponding to the content (rectangle 1073) being selected while selecting the Web content by the upward and downward operation.

FIG. 8 shows another screen example generated by the read history screen generation unit 5.

In a screen 1080, the thumbnail images of the representative Web content of each content group are vertically arranged, thereby enabling the selection of the content group by the upward and downward operation. In addition to the title and the URL (rectangle 1086) of the representative Web content, an icon image 1082 indicating the Web content contained in the same content group is horizontally arranged next to each thumbnail image, thereby enabling the selection by the leftward and rightward operation. In the screen 1080, similar to the screen 1060, the icon images representing the Web contents read on Nov. 30, 2005 are preferentially arranged on the left side, and then the Web contents (icon image 1083) read on days other than on Nov. 30, 2005 are arranged. A relatively large thumbnail image 1085 can be checked in addition to the title and the URL, and the read date and time on the right side of the screen as detailed information corresponding to the Web content (focus 1084) currently being selected.

Here, the icon image is contained in the Web content, showing image data of small size to which characters and figures indicating the providing source are converted, or image data of simple rectangular or round shape prepared in advance and specialized for the function of simply indicating that the content group includes a plurality of contents.

FIG. 9 shows another screen example generated by the read history screen generation unit 5.

In a screen 1090, the thumbnail images of the representative Web content of each content group are horizontally arranged, thereby enabling the selection of the content group by the leftward and rightward operation. The Web content, and the respective thumbnail images (thumbnail image 1091 etc.) contained in the content group being selected are vertically arranged, thereby enabling the selection of the Web content by the upward and downward operation. Furthermore, a trimming image 1092 to be associated to the Web content is horizontally arranged on the right side of the thumbnail image of each Web content, the trimming image is selected by the leftward and rightward operation with the Web content selected, and a position corresponding to the trimming image being selected is highlighted (rectangle 1093) in the thumbnail image. The user can select the Web content while checking the entire image of one Web content and also the detailed information of one part.

Therefore, through the use of the Web content read information display device 20, the thumbnail image obtained by cutting out and reducing only the portion the user has actually looked, and the trimming image obtained by cutting out the portion the user had read for a long time or had pushed the link are generated from the operation of the user at reading the Web content, and then saved and presented on a later date when referencing the read history, so that the user can select the desired Web content while referencing the thumbnail image from which the configuration and the atmosphere of the entire region actually read in the Web content can be grasped and the trimming image in which the region of one part assumed to be the part the user has particularly read consciously can be checked in the same environment (mainly size of text) as the user normally reads the Web content, in addition to the basic information such as the title, the URL, and the read date and time.

Furthermore, the content group in which the Web contents are grouped by a common URL domain, a read period, and the like, and the content group contained in the relevant group are represented with the thumbnail image and the trimming image and are arranged on two axes vertically and horizontally, thereby enabling the selection of the read history by the operation with the up, down, left, and right buttons of the remote controller, the portable telephone, and the like.

(2) Second Exemplary Embodiment

A Web content read information display device 21 according to a second exemplary embodiment of the invention will now be described. The most essential point of the present example is that the read history screen generation unit 5 includes a title correcting section 51, and the read operation acquisition unit 6 includes a layout analyzing section 61, in addition to the configuration of the Web content read information display device 20.

The layout analyzing section 61 analyzes the layout structure of the Web content being read, and performs correction at region determination when creating the thumbnail image and the trimming image. Furthermore, the title correcting section 51 omits the common portion of the title when one part of the title is the same in the Web content group contained in the same content group, so that the user referencing the read history screen can select the desired Web content while checking the information that may be useful to the user.

A configuration view of the Web content read information display device 21 is shown in FIG. 2.

Only the components different from the Web content read information display device 20 of FIG. 1 will be described below.

The layout analyzing section 61 receives the rendering information from the content read operation control unit 3, analyzes the layout of the Web content, divides the contents configuring one Web content into plural blocks, and applies correction to the display region width, as well as the attention coordinate and the link coordinate calculated by the read operation acquisition unit 6 according to the block position. When the boundary of the blocks is near the boundary of the display region width, the display region is extended in accordance with the relevant block if the ratio of the entire block contained in the display region is greater than a defined threshold value, and the display region is reduced so as to eliminate the relevant block if only one part of the block is contained in the display region. Similarly, the attention coordinate or the link coordinate is moved to the left or the right in accordance with the region of the relevant block if the boundary of the block is in the defined range of the attention coordinate or the link coordinate.

Measure of layout analysis includes various methods such as analyzing the description of the structured document such as HTML (Hyper Text Markup Language) and the like describing the Web content, performing image processing on the entire image of the rendered Web content and performing clustering according to the distribution of information, preparing a template related to the layout information for every Web content, and having the content providing side provide the layout information as additional information along with the Web content, and any method may be adopted in the present invention.

The title correcting section 51 omits the common portion of the title when the character string of one part of the title is the same in the Web content group contained in the same content group when generating the read history screen.

As an operation example of the Web content read information display device 21, the read operation information and the link information acquired by the read operation acquisition unit 6 during the reading of the Web content by the user, the thumbnail/trimming image generated by the content image generation unit 7, then a screen example generated by the read history screen generation unit 5 are illustrated, and the flow of generating the thumbnail image and the content image and the read history screen will be described in detail.

FIG. 10 shows an example of the result of analysis of performing the layout structure by the layout analyzing section 61 on the Web content 1100 shown in FIG. 4. Suppose analysis is performed on the assumption that the Web content 1100 is configured by four blocks (blocks 1101 to 1104) shown with a broken line, and the user conducts the read operation (frame 1100 of FIG. 11) similar to the example shown in FIG. 4. Since the majority of the region of the block 1111 is contained in the display region width Sx, Sy, and the attention point is in the block 1111, the block 1111 is assumed as the block of high attention, and changes the horizontal width Sx of the display region to Sx2 according to the boundary on the right end of the block 1111. Furthermore, since the region of the block 1112 contained in the display region width Sx, Sy is small, the vertical width Sy of the display region is changed to Sy2 according to the boundary on the upper end of the block 1112.

The image is cutout according to the changed display region width Sx2, Sy2, and the thumbnail image (FIG. 12, 1120) reduced from the same is generated and saved in the read history information storage unit 8. Furthermore, since the boundary on the upper end of the block 1111 exists in the defined range of the attention coordinate (Tx1, Ty1), the attention coordinate is changed to (Tx1, Tx3), and a thumbnail image 1121 is generated.

FIG. 13 shows a screen example generated by the read history screen generation unit 5.

In a screen 1130, the thumbnail images of the representative Web content of each content group are horizontally arranged. The trimming images of the Web content contained in the content group being selected are vertically arranged. In basic information 1131 of the Web content attached to the trimming image, "news A" at the head of the title common in the Web contents belonging to the same content group is omitted from the title, and displayed. The entire title of the Web content 1064 cannot be checked in the screen 1060 of FIG. 6, but can be checked in the screen 1130. In the present example, the portion to be omitted is the head of the title, but the character string in the middle may be omitted.

FIG. 14 shows another screen example generated by the read history screen generation unit 5.

In a screen 1140, the thumbnail images of the representative content of each content group are vertically arranged, thereby enabling the selection of the content group by the upward and downward operation. In addition to the title and the URL of the representative Web content, an icon image indicating the Web content contained in the same content group is horizontally arranged next to the thumbnail image, thereby enabling the selection by the leftward and rightward operation. A relatively large thumbnail image 1141 can be checked in addition to the title and the URL, and the read date and time on the right side of the screen as detailed information corresponding to the Web content currently being selected. Compared to the thumbnail image 1085 of FIG. 8, the title and the opening portion of an article, which are the head portion of the block, are readable.

Therefore, through the use of the Web content read information display device 21, the thumbnail image and the trimming image displayed on the Web content read information display device 20 enable the user to more easily understand the content.

Furthermore, when the character string of one part of the title is common in the same content group, display is made with the common portion omitted, so that unnecessary information can be eliminated thereby enhancing the viewability when a great number of Web contents in which the head portion of the same site such as blog and bulletin board is the common title had been read particularly under an environment where the display region is limited.

(3) Third Exemplary Embodiment

A Web content read information display device 22 according to a third exemplary embodiment will now be described.

The most essential point of the present example is that the read history screen generation unit 5 includes a read path selection generation section 52, in addition to the configuration of the Web content read information display device 21. The read path selection generation section 52 acquires a read path of the Web content being selected in the read history screen from the history information storage unit 8, arranges in the vicinity of the Web content thereby enabling the selection, so that the user referencing the read history screen can track back a Web content to which the user moved before from the Web content being selected or a Web content which is read before the Web content being selected, without returning to the selecting operation of a different content group while selecting the Web content contained in the content group.

A configuration view of the Web content read information display device 22 is shown in FIG. 15.

Only the components different from the Web content read information display device 21 of FIG. 2 will be described below.

The read path selection generation section 52 references the read path of the Web content held by the history information storage unit 8, arranges the text, the icon image, the thumbnail image, or the trimming image indicating the read Web content in a direction which is perpendicular to the axial direction the Web contents are arranged (i.e., parallel to the axis the content group is arranged) to be selectable, according to the read path of the Web content at the selection of the Web content in the read history screen.

Furthermore, the read path selection generation section 52 presents the trimming image including the link from which the user reached to the relevant Web content as additional information indicating the Web content read one before the relevant Web content with respect to the Web content being selected.

When tracking back the read path and selecting the Web content, the read path selection generation section 52 changes the display of the content group and the Web content being selected so that the Web content belonging to the same content group as the Web content currently being selected can be selected.

As an operation example of the Web content read information display device 22, a screen example generated by the read history screen generation unit 5 is shown in FIG. 16, and the read history screen will be described in detail. In a screen 1160, the thumbnail images of the representative Web content of each content group are arranged horizontally, thereby enabling the selection with the leftward and rightward operation. The trimming images of the Web content contained in the content group being selected are arranged vertically thereby enabling the selection with the upward and downward operation. In selecting the Web content, the trimming image showing the Web content are arranged horizontally in the order the user actually read in the past according to the read path of the Web content (trimming image 1161) being selected, thereby enabling the selection with the leftward and rightward operation.

In the example of the screen 1160, the article related to "Case A" is being selected of the Web content read in the past in the site "blog A", where a Web content 1162 arranged on the left of the Web content 1161 being selected shows the Web content read one before the Web content 1161, and the trimming images of the periphery of the link pressed when moving to the Web content 1161 are displayed.

If the read path of the user is the path of returning to the Web content 1161 after moving to another page from the Web content 1161, then selecting still another link to move to still another Web content, the trimming image showing the same Web content is arranged in plurals as in the example of screen 1160 (trimming images 1161, 1163).

FIG. 17 shows a screen example of when the operation to the left is tried once from the state of the screen 1160.

With this, it becomes a state in which the Web content 1162 is selected, and the trimming image is changed to be a trimming image 1162 including the link, then switched to be the trimming image 1171 generated from the attention coordinate. The thumbnail image group is scrolled so that the thumbnail image 1172 indicating the content group to which the Web content 1171 being selected belongs comes to the center of the upper part of the screen, and the trimming images indicating the Web contents contained in the content group indicated by the thumbnail image 1172 are rearranged in the up-down direction. In the example of the screen 1170, the Web content 1171 is one of the Web content read in the past in a site "blog B", and is an article related to "case A", similar to the Web content 1161.

Therefore, through the use of the Web content read information display device 22, the read path of each Web content can be presented and selected while checking the Web contents refined by the read period and the URL domain, which helps the user remember the circumstances under which the user came to read the relevant Web content and allows the user to move to the Web content belonging to another group by tracking back the read path without returning to group selection even if mistaking the initial group selection (refinement).

In particular, when reading the blog, the bulleting board, or the news site dealing with the articles of a common content while tracking back the link, it can be expected that the desired Web content can be reached if one Web content dealing with a related article is found, by tracking back the read path therefrom when the user doesn't remember the accurate title, period, and the content group (site) to which it belongs when searching for a specific Web content dealing with the relevant content.

(4) Fourth Exemplary Embodiment

A Web content read information display device 23 will now be described. The most essential point of the present example is in further arranging a bookmark screen generation unit 9 and a bookmark information storage unit 10 in addition to the configuration of the Web content read information display device 22. The bookmark screen generation unit 9 associates the read history information held by the history information storage unit 8 and bookmark information registered by the user held by the bookmark information storage unit 10, and displays the bookmark information and the history information together so that the Web content read in the past belonging to the same content group as the bookmark-registered Web content can be directly selected.

A configuration view of the Web content read information display device 23 is shown in FIG. 18.

Only the components different from the Web content read information display device 22 will be described below.

The bookmark information storage unit 10 holds the title and the URL of the Web content registered by the user as favorite as the bookmark information. The bookmark screen generation unit 9 references the read history information held by the history information storage unit 8 and the bookmark information held by the bookmark information storage unit 10, and generates a bookmark screen associating each bookmark-registered Web content to the related history information and presenting the same.

As an operation example of the Web content read information display device 23, a screen example generated by the bookmark screen generation unit 9 is shown in FIG. 19, and the bookmark screen will be described in detail.

In a screen 1190, the thumbnail images of the bookmark-registered Web content are horizontally arranged, thereby enabling the thumbnail images to be selected by the leftward and rightward operations. Furthermore, if the Web content contained in the same content group as the bookmark-registered Web content being selected exists in the read history, the trimming images showing the corresponding Web content are vertically arranged, thereby enabling the trimming images to be selected by the upward and downward operation (trimming image 1191).

In the example of the screen 1190, with the Web content "news A" which is bookmark registered in a "TV/news" folder selected, the Web contents in the site "news A" are arranged in reverse chronological order by date and time under the thumbnail images showing the relevant Web content.

The user can check the related read history while selecting the bookmark, and can directly select the read history and move to the corresponding Web content if necessary.

FIG. 20 shows another screen example generated by the bookmark screen generation unit 9.

In a screen 1200, the thumbnail images of the bookmark-registered Web content are horizontally arranged, thereby enabling the thumbnail images to be selected by the leftward and rightward operations. Furthermore, if the Web content contained in the same content group as the bookmark registered Web content being selected exists in the read history, the titles showing the corresponding Web content are vertically displayed in a list, thereby enabling the contents to be selected by the upward and downward operations (list 1201).

Moreover, the read path which starts from the Web content (focus 1202) being selected can be tracked back with the leftward and rightward operations. In the example of the screen 1200, with the bookmark-registered search system A selected, the Web contents showing the result of search when the keyword is actually input are displayed in a list with the top page of the search system A at the head in the list 1201.

As in the example of the screen 1200, the used keyword can be directly checked in the search system in which the search keyword is reflected on the Web content title. Furthermore, the Web content moved from the search result can be selected with the leftward and rightward operations while checking a thumbnail image 1203 in addition to the title and the URL.

Therefore, through the use of the Web content read information display device 23, the bookmark-registered Web content can be selected while checking the thumbnail image, and in addition, the read history related to the Web content being selected can be presented to be selected, so that the read history can be directly selected to move to the corresponding Web content. As a result, the trouble of selecting the bookmark-registered Web content and tracking back to the desired page while recalling the past memory is alleviated.

(5) Fifth Exemplary Embodiment

A Web content read information display device 24 will now be described. The essential point of the present example is that a content conversion unit 11 and a page block selection generation unit 12 are arranged, in addition to the configuration of the Web content read information display device 20, and that the content image generation unit 7 includes a block image generation section 71. The content conversion unit 11 performs a content conversion process so that the acquired Web content can be comfortably read on the portable telephone and the TV/remote controller environment. Furthermore, the block image generation section 71 generates a block image showing the content of each page converted (divided) from the original Web page from the index page generated by the content conversion unit 11, and saves the same in the read history information storage unit 8. Thereafter, when the user references the read history, the page block selection generation unit 12 references the read operation information held by the read history storage unit 8, and generates a page block selection screen enabling the thumbnail images and the trimming image of the Web content referenced in the past, and the block image to be referenced.

A configuration view of the Web content read information display device 24 is shown in FIG. 21.

Only the components different from the Web content read information display device 20 will be described below.

The content conversion unit 11 receives information related to the Web content read operation from the content read operation control unit 3, and accesses the Web content desired by the operator through the network communication unit 4. The content conversion unit 11 analyzes the content of the Web content (tag configuration, image, layout information, and the like) received through the network communication unit 4, and executes conversion processes such as reducing, deleting, or converting the image, changing or deleting the tag, dividing a page to a plurality of contents, and generating an index page which displays the divided pages in a list for enabling the selection of an arbitrary page. Then, the content conversion unit 11 outputs the index page and the information (link position and layout information) related to a position corresponding to each divided page in the index page to the content read operation control unit 3. The content conversion unit 11 receives the read operation in the index page of the operator, and outputs the divided page corresponding to the operation content (selected link) to the content read operation control unit 3.

The conversion of the Web content may be performed on all the acquired contents, or may be performed only on the Web content created on the assumption of being read on the PC (hereinafter referred to as "PC Web content"). For instance, in cases where the acquired content is using a full set of HTML tag, using Java script or Flash, or using a large size image, determination is made that the relevant Web content is the PC Web content.

The read operation acquisition unit 6 receives the information related to the content read operation in the index page from the content read operation control unit 3, acquires title, URL, read start date and time, read end date and time, and in addition, a region (coordinate) displayed on the screen of every defined time (e.g., one second) as read region information, and a position of a pressed link or a button and the link destination URL etc. thereof as link information, then outputs the same to the content image generation unit 7 and the read history information storage unit 8.

The block image generation section 71 receives the read region information and the link information from the read operation acquisition unit 6, determines the portion to be cutout from the image of the entire index page according to the read region, generates the thumbnail image by reducing the size of the cutout rectangular region, and outputs the same to the history information storage unit 8. Further, the block image generation section 71 determines the region corresponding to each divided page of the index page according to the correspondence relationship of the index page and the divided page, generates the block image in which the portion including the region corresponding to each divided page is cut out from the entire image of the index page with respect to all the divided pages, and outputs the same to the read history information storage unit 8.

When the read history screen generation unit 5 generates the read history screen, the page block selection generation unit 12 arranges, assuming that the content whose block image is held in the read history information storage unit 8 as the index page, an icon image near the trimming image of the corresponding content in the read history screen to indicate the content is the index page, and receives the output from the read history screen generation unit 5 when selecting the Web content in the read history screen and starts to generate the page block selection screen. Further, the page block selection generation unit 12 arranges the icon images or the thumbnail images representing the index page of the read content grouped according to the domain of the URL horizontally or vertically according to the name of the content or the read frequency, and arranges the title list or the block image or the thumbnail image showing each divided page of the same content in the other axial direction, thereby generating a page block selection screen enabling the selection of the read location (divided page) in up and down and left and right directions with the remote controller and outputs the same to the content read operation control unit 3.

As an operation example of the Web content read information display device 24, the index page and the divided page converted and generated by the content conversion unit 11, the block image generated by the block image generation section 71, and a screen example generated by the page block selection generation unit 12 when the Web content is read by the user are shown, and the flow of generating the block screen and the page block selection screen will be described in detail from the content read operation of when the conversion process is performed on the PC Web content.

FIG. 22 shows a conversion processing example of the PC Web content to be read by the user.

The content conversion unit 11 analyzes the content of a PC Web content 2000, and performs correction of structured document so as to be suited for read environment on the client terminal such as adjustment of the size of the characters and the images, deletion of the portion (JavaScript, Flash, etc.) requesting for interaction difficult to be dealt with by the portable telephone and the remote controller operation. In this case, in order to alleviate the problem of being difficult to move within the single content and searching for the necessary information due to the excessive amount of information contained in a single content to be read on the portable telephone or the remote controller environment, the content conversion unit 11 divides the content to a plurality of divided pages (FIG. 22, Web contents 2011 to 2014) and creates an index page (FIG. 22, Web content 2020) describing a list of divided pages and enabling the movement to an arbitrary divided page.

The divided page 2011, the divided page 2012, the divided page 2013, and the divided page 2014 respectively correspond to a block 2001, a block 2002, a block 2003, and a block 2004 in the PC Web content 2000, and are converted from the information in each block so as to be readable in the client terminal environment. In this example, the index page 2020 includes a image which is obtained by reducing the size of the original PC Web content 2000, and holds the layout information with respect to each block and the divided page, but there may be another example in which only a text link for calling out each divided page is displayed.

FIG. 23 shows an example of the conversion processed Web content read by the user.

When the user accesses the PC Web content, an index page 2100 generated by the content conversion unit is referenced as indicating an overall image (list of content) of the PC Web content, and the block to be referenced for details is selected therefrom so that detailed information (content described originally for PC Web content) can be referenced. For instance, when the user selects and determines a block 2101 in the index page 2100, the page transits to a divided page 2102 corresponding to the block 2101 and the relevant page can be referenced. Also, when referencing the divided page 2102, user can return to the index page 2100 and select a different block by pushing the "return" button of the browser. Or, by pushing a link to a different Web content included in the divided page 2102, the user can access another Web content.

The read operation acquisition unit 6 acquires the operation information of the user in the index page 2100.

The content image generation unit 7 creates and holds an image file of the entire index page 2100, and then creates the thumbnail image and the trimming image and saves the same in the read history information storage unit 8. Furthermore, the block image generation section 71 cuts out an image according to the defined horizontal and vertical widths with respect to all the corresponding portions of each divided page in the index page, generates the block image, and saves the same in the read history information storage unit 8 as the block image of each divided page. In this example, four block images (FIG. 24, 2201 to 2204) are generated for all the divided pages.

FIG. 25 shows a screen example generated by the read history screen generation unit 5 when the user references the past read history.

In a read history screen 2300, the Web contents are grouped by URL domain, and the thumbnail images of the representative content of each content group are horizontally arranged. Furthermore, the trimming images of the Web content read in the past in the Web content group being selected are vertically arranged.

In the present example, the domain (news A) containing the PC Web content is being selected, trimming images 2303 of the PC Web content in the same site are vertically arranged according to the read date and time under a thumbnail image 2302 of the top page of the news A, and an icon image 2301 clearly showing that the corresponding Web content is the Web content for PC (include index page) is displayed with respect to each trimming image.

The user can check whether the content being selected is the Web content for PC while performing the Web content selection by the upward and downward operation. When the user selects and determines the Web content for PC, the screen transits to the page block selection screen for the selected Web content.

FIG. 26 shows a screen example generated by the page block selection generation unit 12 when transits from the read history screen.

In a page block selection screen 2400, the URL of the representative content of the content group containing the Web content being selected is described in a title part 2401 in correspondence to the transition from the read history screen 2300. Thumbnail images 2402 of the Web content (index page) belonging to the content group containing the Web content being selected are horizontally arranged. In this example, thumbnail images are horizontally arranged in order of title of the Web content. In the page block selection screen 2400, a thumbnail image 2403 at the center of the screen is being selected, and the title and the URL are presented as information related to the thumbnail image being selected.

The user can switch the Web content (index page) by the leftward and rightward operation while checking the thumbnail image from which the configuration and the atmosphere of the entire Web content (index page) can be grasped.

Furthermore, a block image 2404 corresponding to each divided page is arranged vertically as all selectable divided pages from the Web content (index page) being selected. The order of arrangement of the divided page (block image) is, firstly, to line the divided pages read in the past preferentially in the order of read time, and then line the divided pages not read in the order of notation in the original PC Web content, thereby enabling the selection by the upward and downward operation.

The user can search for the desired divided page while checking the block image from which an overall view of the content of the divided page (one part of PC Web content) can be grasped in addition to the basic information such as the title and the URL of the divided page, the read date and time, and the presence of read history.

Furthermore, as the user advances the selection of the divided page in the downward direction, the user can select a divided page 2405 not read in the past while checking the block image, and also, a rough content can be expected to be checked even for the portion which is not referenced when reading the PC Web content before.

The user directly selects the information (divided page) of one part of the PC Web content desired by the user in the page block selection screen 2400 thereby eliminating the trouble of tracking back the index page and selecting the divided page at read time.

Therefore, through the use of the Web content read information display device 24, when conversion processing the Web content, and reading the content divided from the original Web content and generated with the index page, the block image is generated and saved from the index page for the portion corresponding to the link and the content to each divided page in addition to the generation of the thumbnail image and the trimming image for the index page, which are presented when displaying information related to the original Web content (e.g., content for PC) when referencing the read history at a later date, so that the necessary block can be directly selected and accessed while checking the read history (include presence of read) related to each block (divided page) configuring the original Web content.

The configuration view shown in FIG. 21 is a configuration in which the client terminal held by the user who reads the Web includes all the processing units, but a configuration in which the content conversion unit 11 is held by the external server, the PC Web content is accessed through the external server and the conversion processed Web content (index page and divided page) is received by the client terminal may be adopted.

In the case of such configuration, one part of the block (divided page) configuring the PC Web content is directly specified and accessed on the client terminal side, so that the amount of communication data between the client terminal and the external server including the content conversion processing unit 11 can be reduced and the user can reach the desired information with lesser standby time.

(6) Sixth Exemplary Embodiment

A Web content read information display device 25 will now be described. The most essential point of the present example is to include the content conversion unit 11 and the page block selection generation unit 12 in addition to the configuration of the Web content read information display device 23, the content image generation unit 7 including a block image generation section 71. The content conversion unit 11 performs a content conversion process so that the Web content can be comfortably read on the portable telephone and the TV/remote controller environment. Furthermore, the block image generation section 71 generates a block image showing the content of each page converted (divided) from the original Web page from the index page generated by the content conversion unit 11, and saves the same in the read history information storage unit 8. Thereafter, when the user references the bookmark, the page block selection generation unit 51 references the read operation information held by the read history storage unit 8, and generates a page block selection screen enabling the thumbnail images and the trimming image of the Web content referenced in the past, and the block image to be referenced.

A configuration view of the Web content read information display device 25 is shown in FIG. 27.

Only components different from the Web content read information display devices 23, 24 will be described below.

When the bookmark screen generation unit 9 generates the bookmark screen, the page block selection generation unit 12 arranges, assuming that the content whose block image is held in the read history information storage unit 8 as the index page, an icon image near the trimming image of the corresponding content in the bookmark screen to indicate the content is the index page, and receives the output from the bookmark screen generation unit 9 and starts to generate the page block selection screen when the Web content is selected in the bookmark screen. The page block selection generation unit 12 also arranges the icon images or the thumbnail images representing the index page of the read content belonging to the same content group (having the same domain) as the bookmark-registered Web content horizontally or vertically according to the name of content or the frequency of read, and arranges the list of titles representing each divided page in the content or the block image or the thumbnail image in the other axial direction to generate the page block selection screen enabling the selection of the read location (divided page) with the up and down, and left and right of the remote controller, and output the same to the content read operation control unit 3.

As an operation example of the Web content read information display device 25, the index page and the divided page, and the block image similar to those introduced in the fifth exemplary embodiment are assumed to be held in the read history information storage unit 8, and a screen example generated by the page block selection generation unit 12 is illustrated, and the portion for transiting from the bookmark screen to the page block selection screen will be described in detail.

FIG. 28 shows a screen example generated by the bookmark screen generation unit 9 when the user references the past read history.

In a bookmark screen 2500, the thumbnail images 2502 of the bookmark registered Web content are horizontally arranged. Furthermore, if the Web content contained in the same content group as the bookmark registered Web content being selected exists in the read history, the trimming images 2503 showing the corresponding Web content are vertically arranged.

In the present example, the domain (news A) including the PC Web content is being selected, the trimming images of the PC web content in the same site are arranged vertically according to the read date and time under the thumbnail image of the news A, and an icon image 2501 clearly indicating that the corresponding Web content is the Web content for PC (include index page) is displayed with respect to each trimming image.

The user can check whether the content being selected is the Web content for PC while selecting the Web content with the upward and downward operation. When the user selects and determines the Web content for PC, the screen transits to the page block selection screen for the selected Web content.

FIG. 29 shows a screen example generated by the page block selection generation unit 12 when transits from the bookmark screen.

In a page block selection screen 2600, the URL of the bookmark-registered Web content containing the Web content being selected is described in a title part 2601 in correspondence to the transition from the bookmark screen 2500. Thumbnail images of the Web content (index page) belonging to the content group containing the Web content being selected are horizontally arranged.

In the page block selection screen 2600, a thumbnail image at the center of the screen is being selected, and the title and the URL are presented as information related to the thumbnail image being selected. The user can switch the Web content (index page) by the leftward and rightward operation while checking the thumbnail image from which the configuration and the atmosphere of the entire Web content (index page) can be grasped. Furthermore, a block image corresponding to each divided page is arranged vertically as all selectable divided pages from the Web content (index page) being selected.

The order of arrangement of the divided page (block image) is to line the divided pages read in the past preferentially in the order of read time, and then line the divided page not read in the order of notation in the original PC Web content, thereby enabling the selection by the upward and downward operation.

The user can search for the desired divided page while checking the block image from which an overall view of the content of the divided page (one part of PC Web content) can be grasped, in addition to the basic information such as the title and the URL of the divided page, the read date and time, and the presence of read history. Furthermore, as the user advances the selection of the divided page in the downward direction, the user can select a divided page not read in the past while checking the block image, where a rough content can be expected to be checked even for the portion not referenced when reading the PC Web content before.

The user directly selects the information (divided page) of one part of the Web content desired by the user in the page block selection screen 2600 thereby eliminating the trouble of tracking back the index page and selecting the divided page at reading time.

Therefore, through the use of the Web content read information display device 25, the necessary block can be directly selected and accessed while checking the read history (include presence of read) related to each block (divided page) configuring the Web content from the bookmark screen by presenting the thumbnail images and the block image as information related to the associated Web content when referencing the bookmark registered Web content.

The configuration view shown in FIG. 27 is a configuration in which the client terminal held by the user who reads the Web includes all the processing units, but a configuration in which the content conversion unit 11 is held by the external server, the PC Web content is accessed through the external server and the conversion processed Web content (index page and divided page) is received by the client terminal may be adopted.

In the case of such configuration, one part of the block (divided page) configuring the PC Web content is directly specified and accessed on the client terminal side, so that the amount of communication data between the client terminal and the external server including the content conversion processing unit 11 can be reduced and the user can reach the desired information with lesser standby time.

According to the present invention, even if the display region of the display is limited or the direct pointing device and the keyboard are not arranged when reading the Web content, and particularly, when reading the Web content with the portable telephone or the TV viewing environment by the remote controller operation, the user can easily access the desired Web content read in the past by providing the read history screen and the bookmark screen presenting the thumbnail images and the trimming images of the relevant Web content assumed to have been paid attention by the user in the past in addition to the title and the URL when the user references the read history.

Furthermore, assuming the reading of the Web content with the portable telephone or the TV viewing environment by the remote controller operation, when cooperating with the service of performing conversion process to a format the Web content so as to be more easily read, access to one part of the information included in the desired Web content read in the past by the user can be facilitated by acquiring the history information on not only the Web content before conversion but also individual content obtained by dividing the original Web content, and presenting the read history screen and the bookmark screen presenting the block image indicating each content configuring the single Web content.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent applications No. 2006-097285, filed on Mar. 31, 2006, the disclosure of which is incorporated herein in its entirety by reference.

Figure 1:
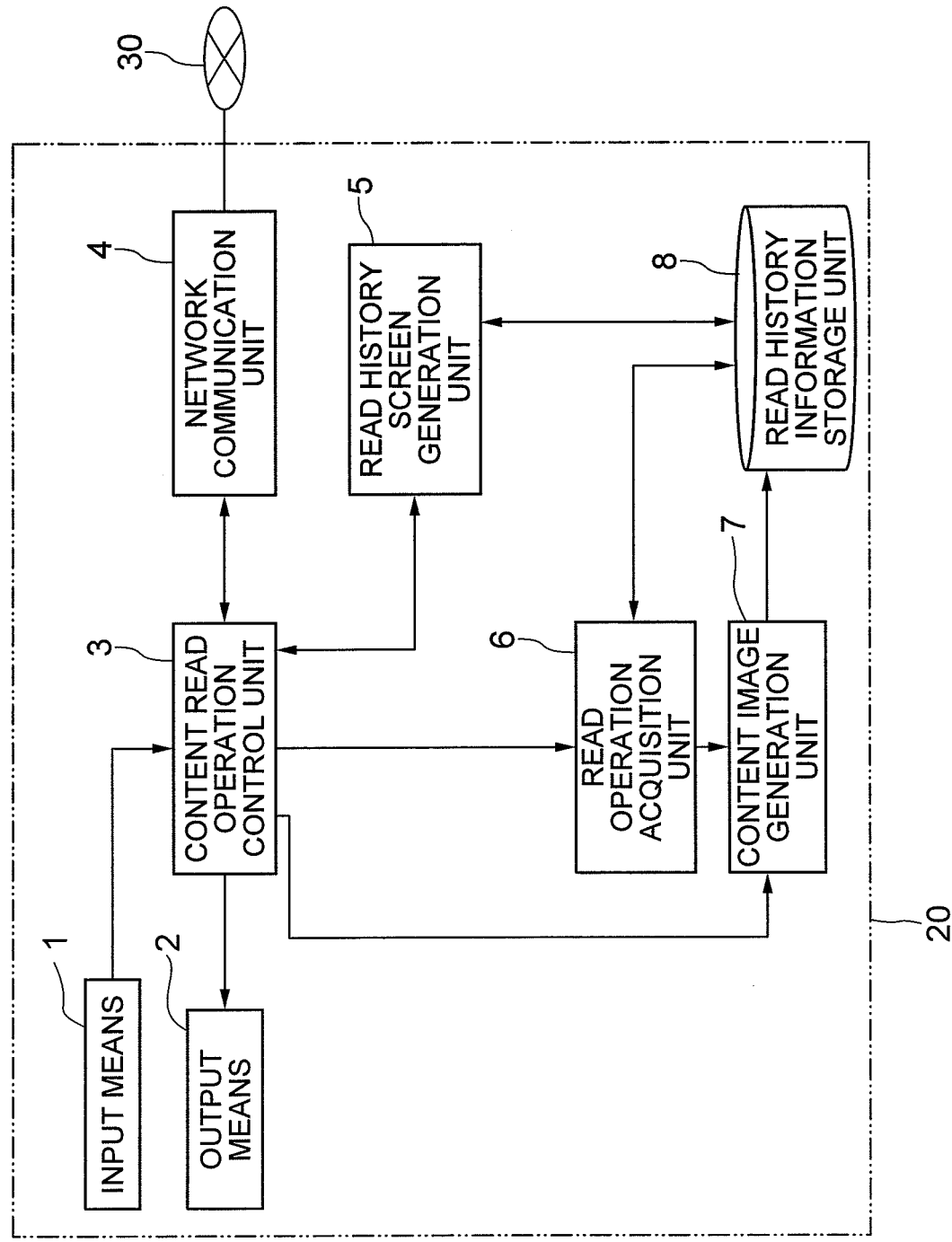
FIG. 1 is a configuration view showing one example of a configuration of a Web content read information display device according to a first exemplary embodiment of the present invention.
Figure 2:
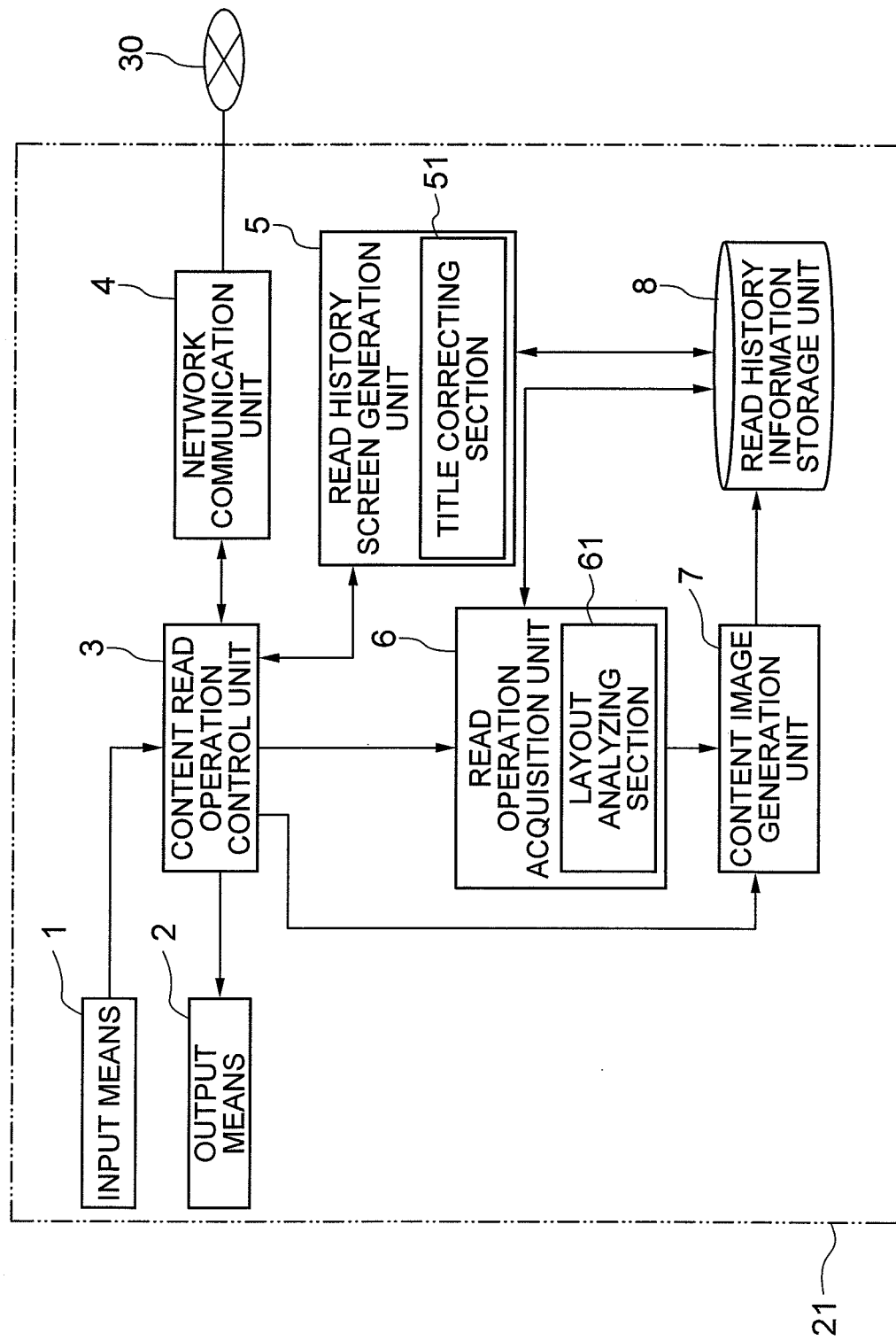
FIG. 2 is a configuration view showing one example of a configuration of a Web content read information display device according to a second exemplary embodiment of the present invention.
Figure 3:
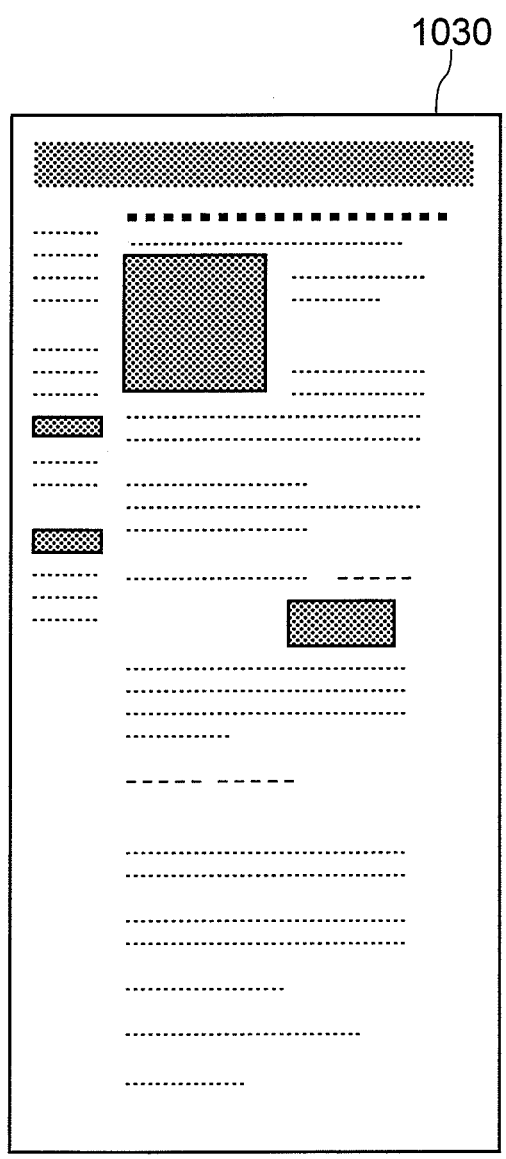
FIG. 3 is an explanatory view showing one example of a Web content.
Figure 4:
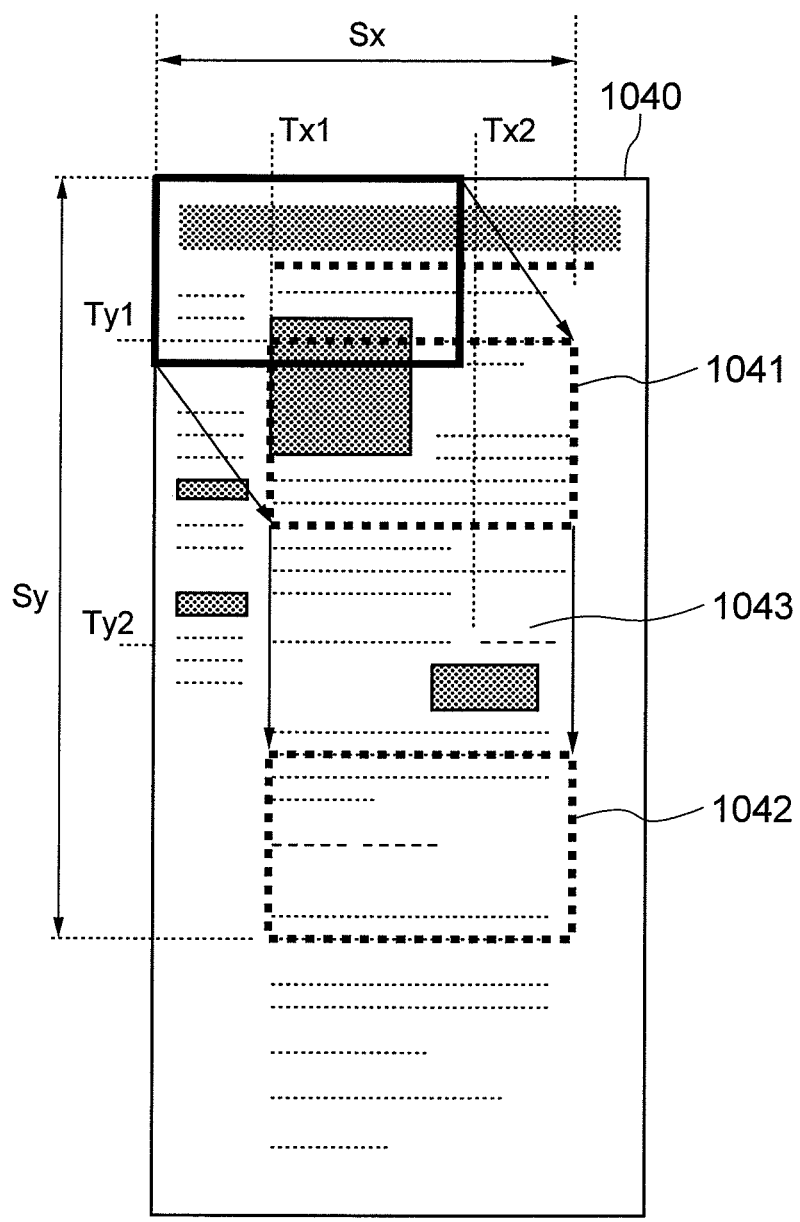
FIG. 4 is an explanatory view showing one example of a Web content read operation acquisition process.
Figure 5:
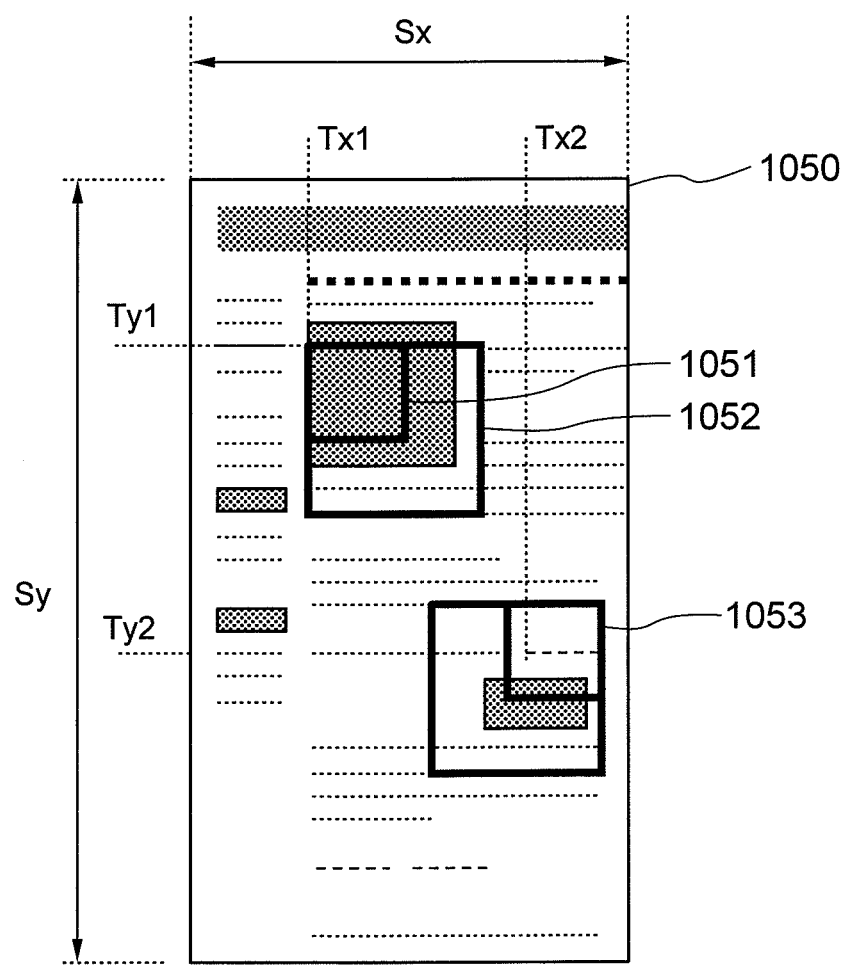
FIG. 5 is an explanatory view showing one example of a Web content image generation process.
Figure 6:
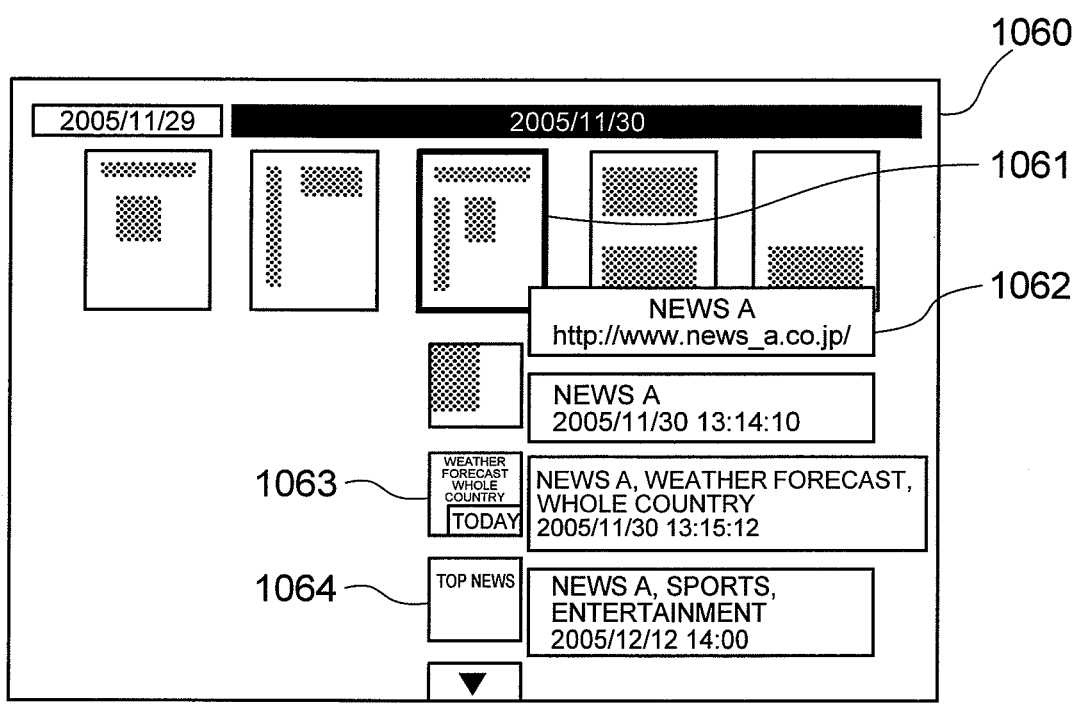
FIG. 6 is an explanatory view showing one example of the read history screen.
Figure 7:
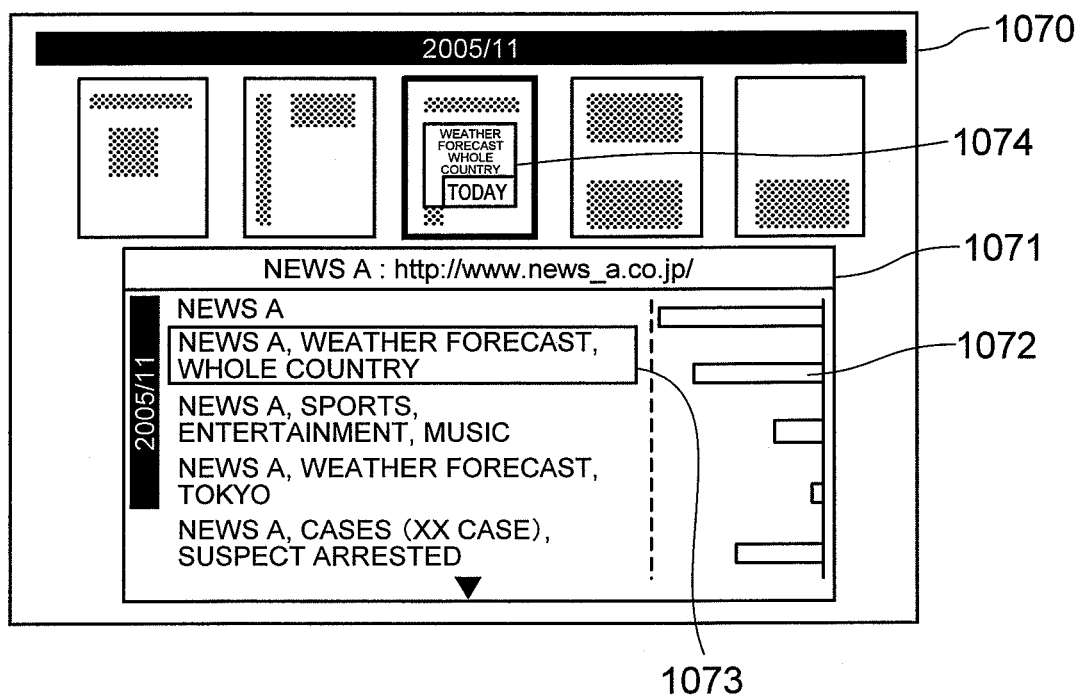
FIG. 7 is an explanatory view showing one example of the read history screen.
Figure 8:
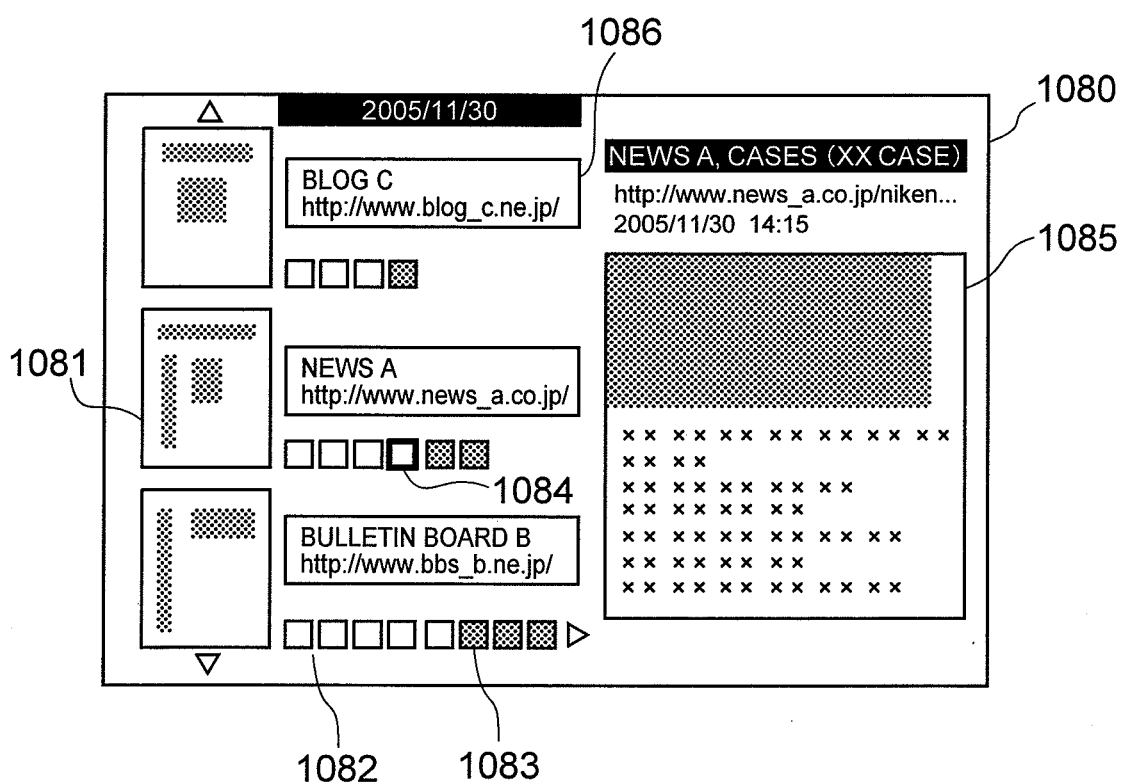
FIG. 8 is an explanatory view showing one example of the read history screen.
Figure 9:
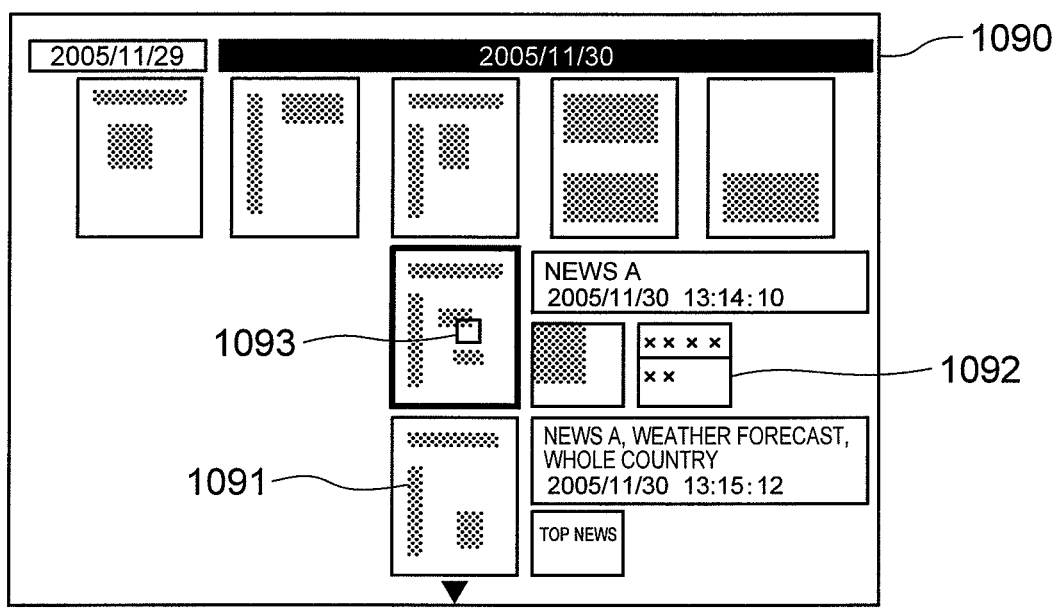
FIG. 9 is an explanatory view showing one example of the read history screen.
Figure 10:
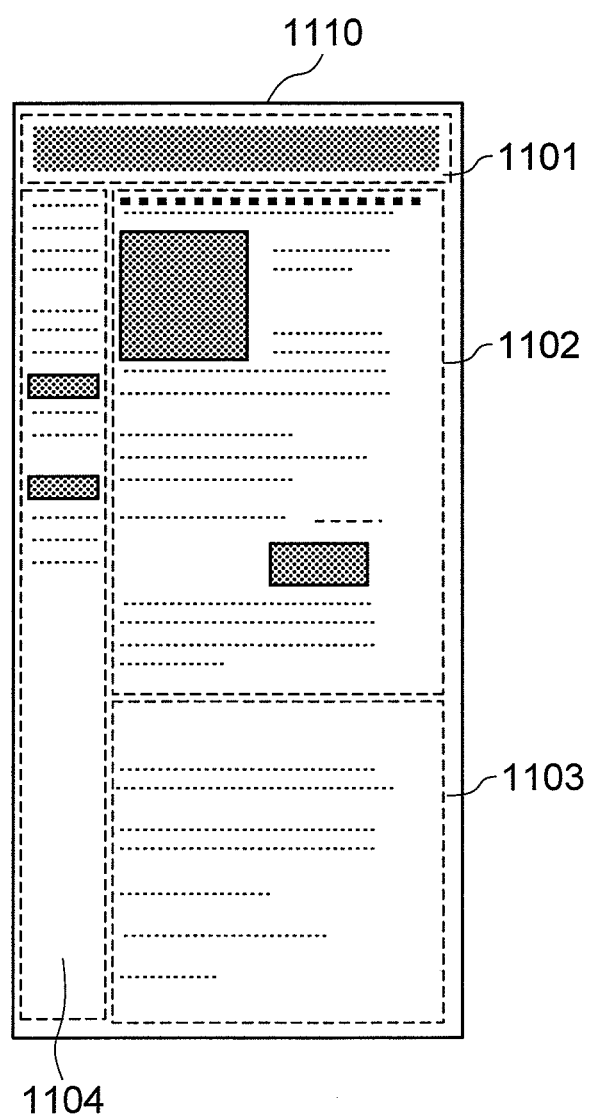
FIG. 10 is an explanatory view showing one example of a result of layout analysis of the Web content.
Figure 11:
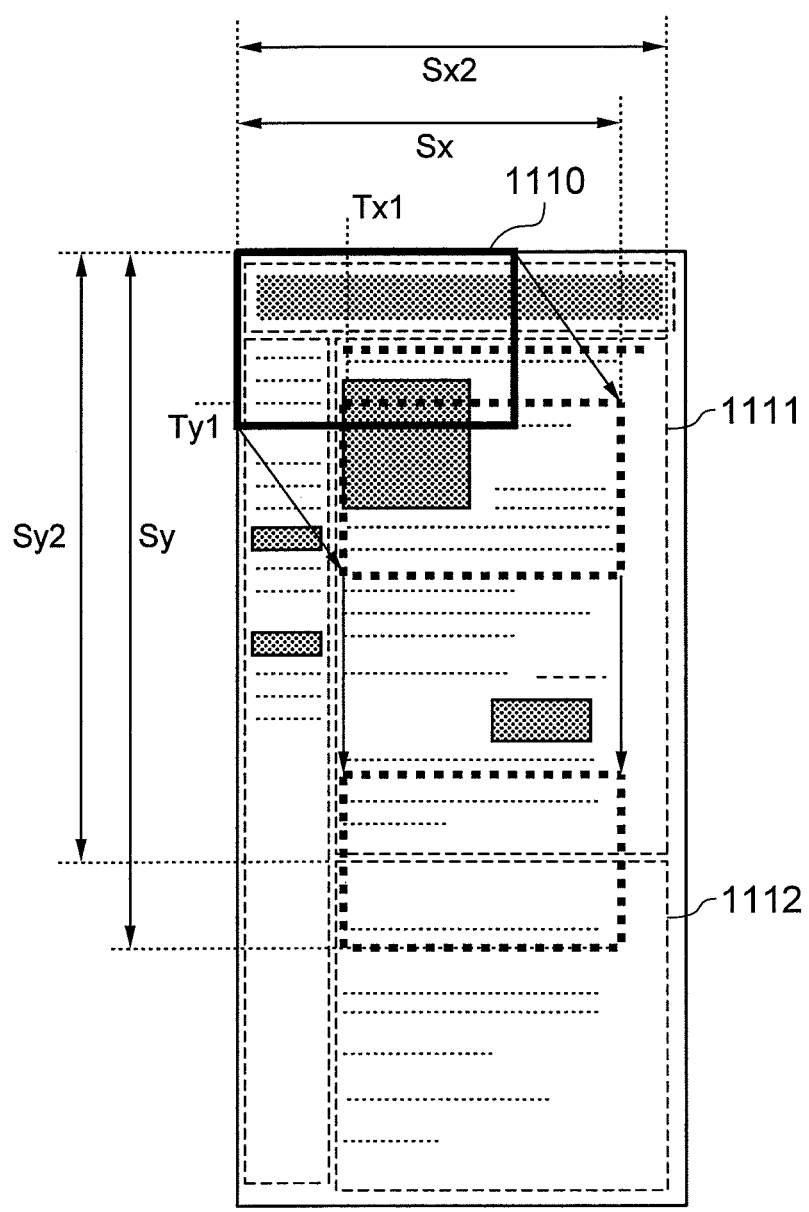
FIG. 11 is an explanatory view showing one example of a Web content read operation acquisition process.
Figure 12:
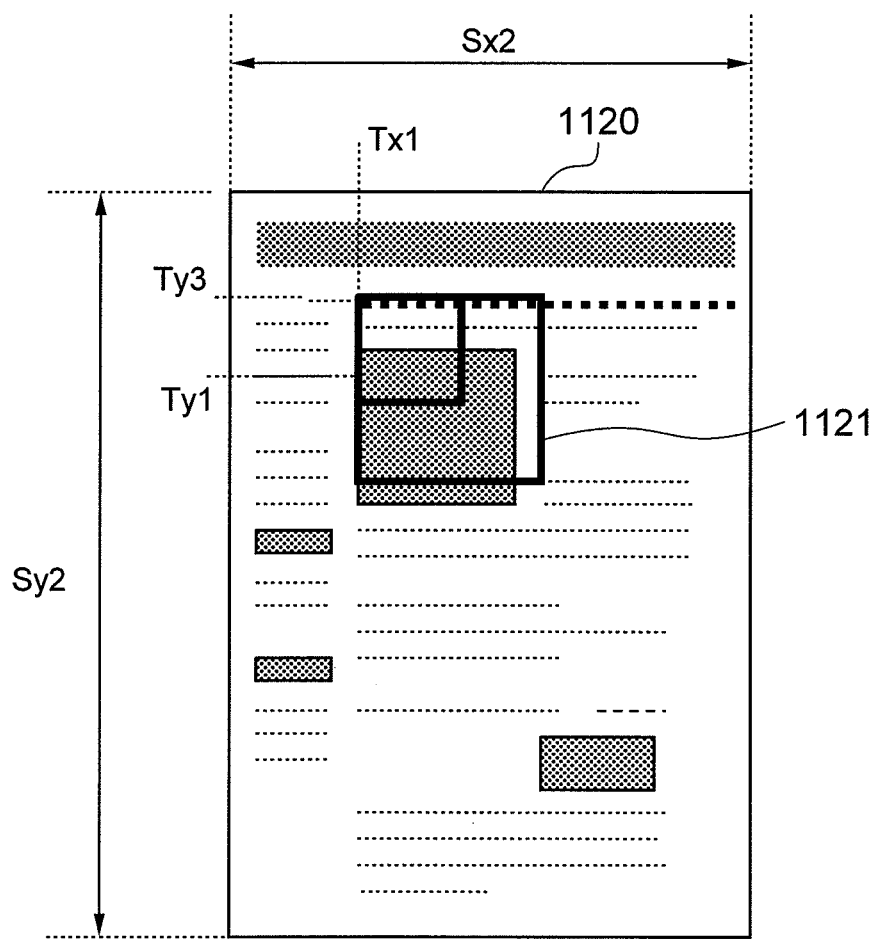
FIG. 12 is an explanatory view showing one example of a Web content image generation process.
Figure 13:
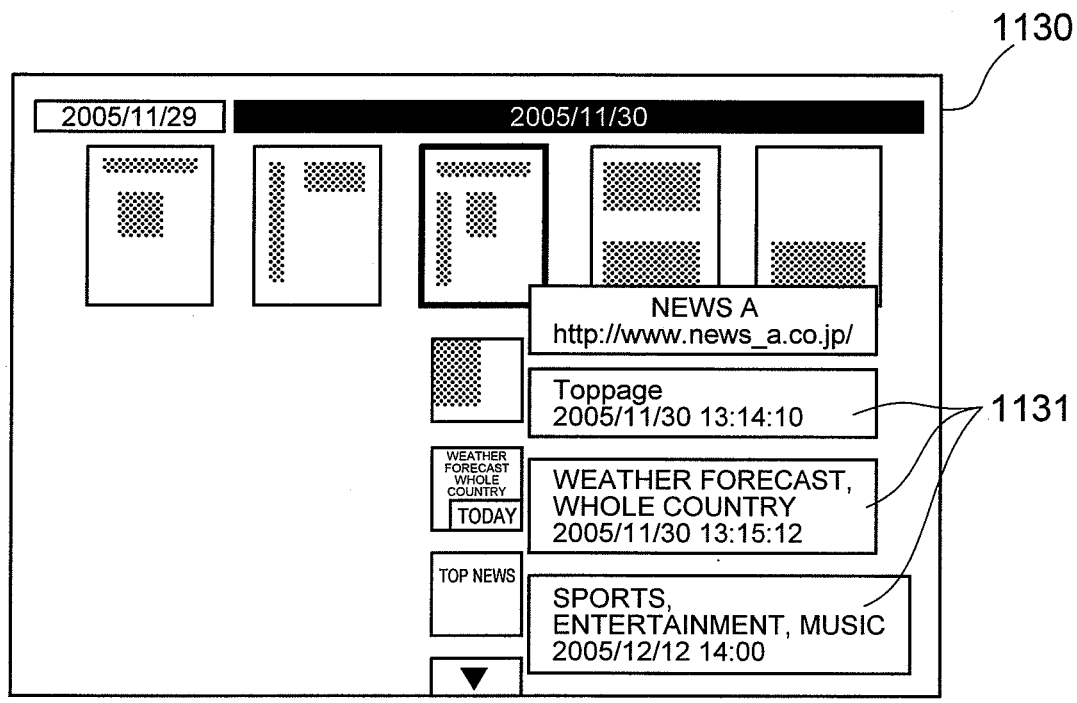
FIG. 13 is an explanatory view showing one example of a read history screen.
Figure 14:
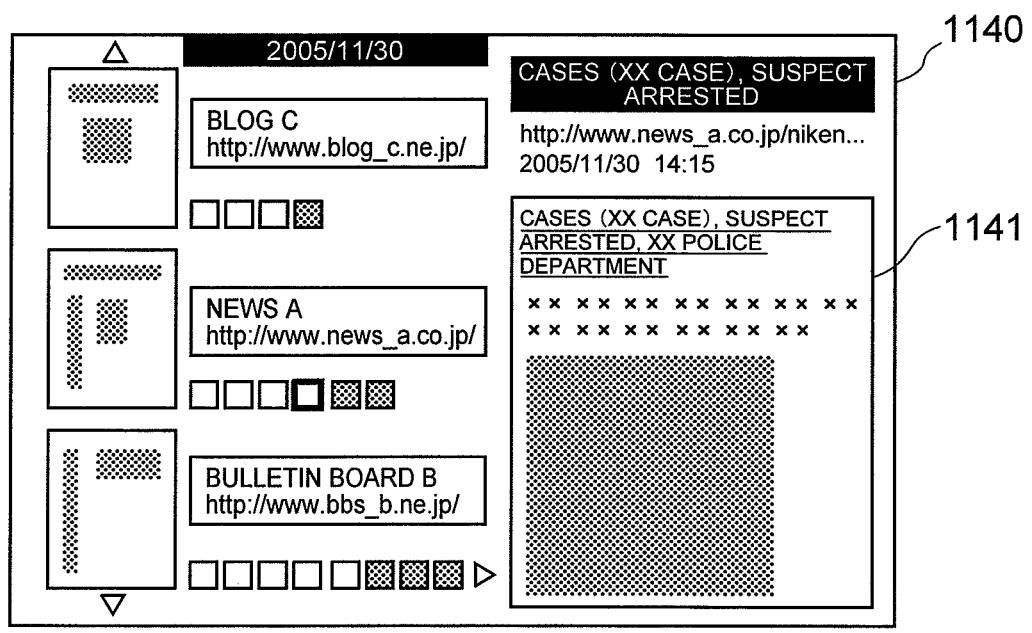
FIG. 14 is an explanatory view showing one example of a read history screen.
Figure 15:
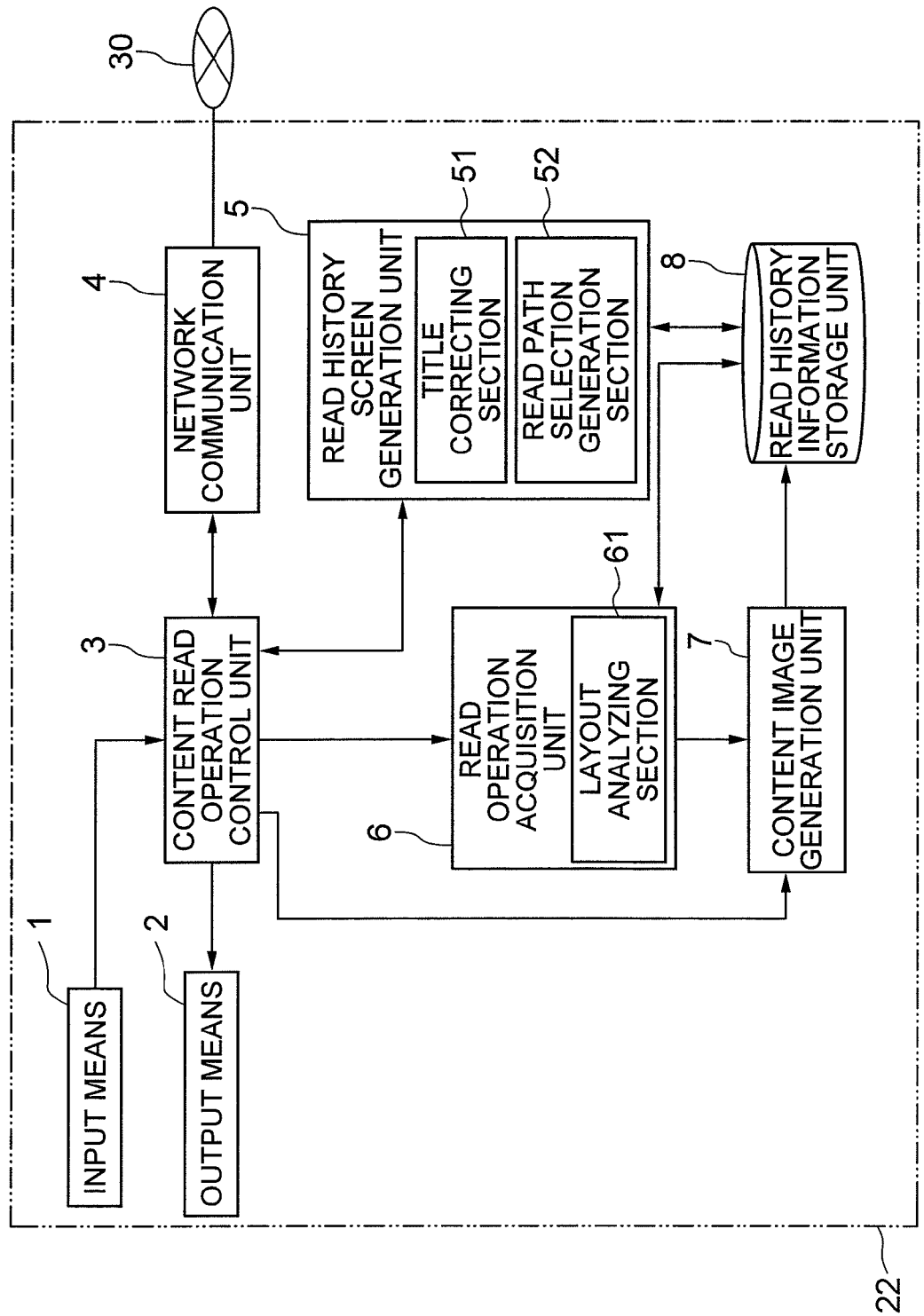
FIG. 15 is a configuration view showing one example of a configuration of a Web content read information display device according to a third exemplary embodiment of the present invention.
Figure 16:
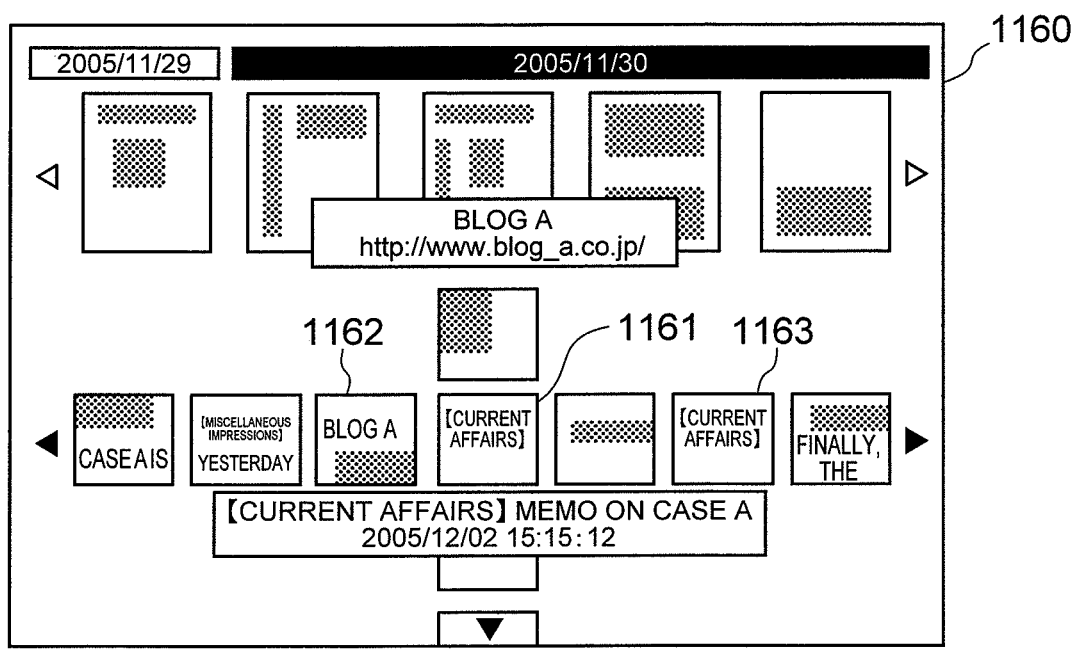
FIG. 16 is an explanatory view showing one example of a read history screen.
Figure 17:
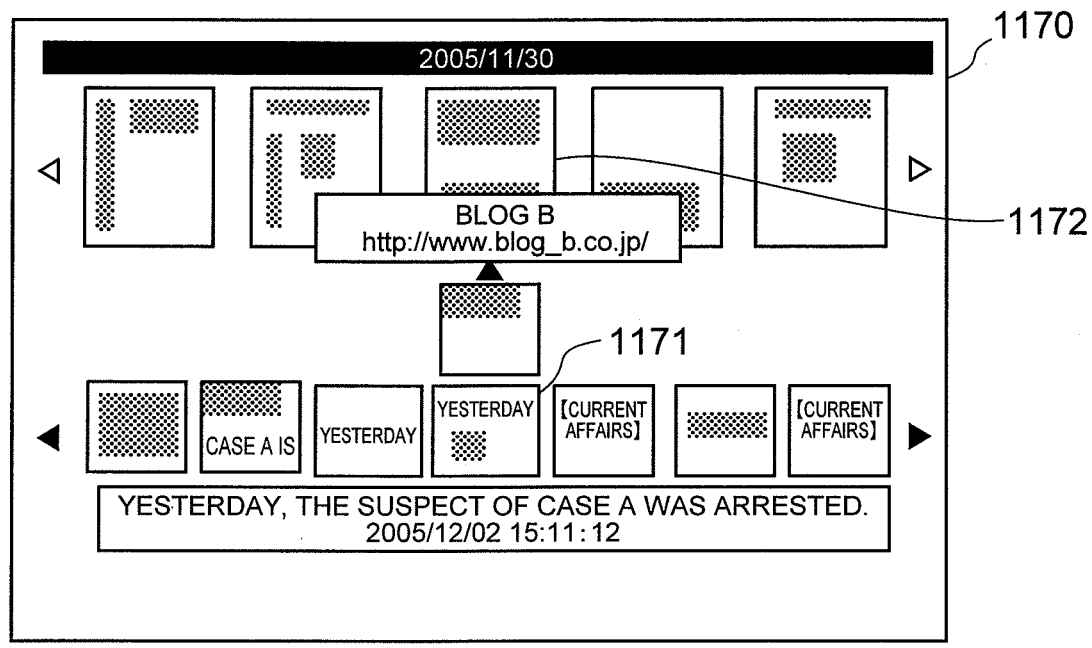
FIG. 17 is an explanatory view showing one example of a read history screen.
Figure 18:
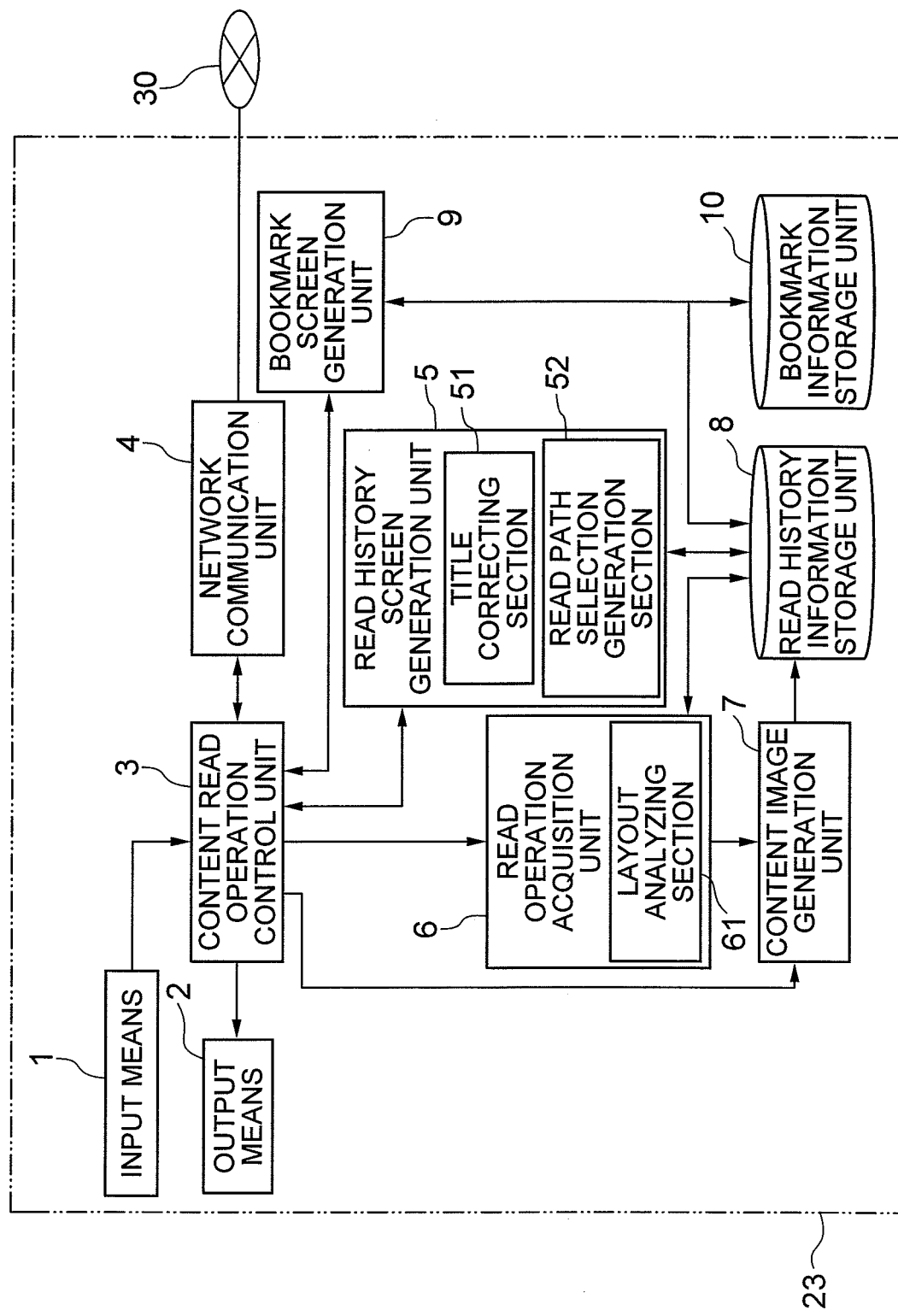
FIG. 18 is a configuration view showing one example of a configuration of a Web content read information display device according to a fourth exemplary embodiment of the present invention.
Figure 19:
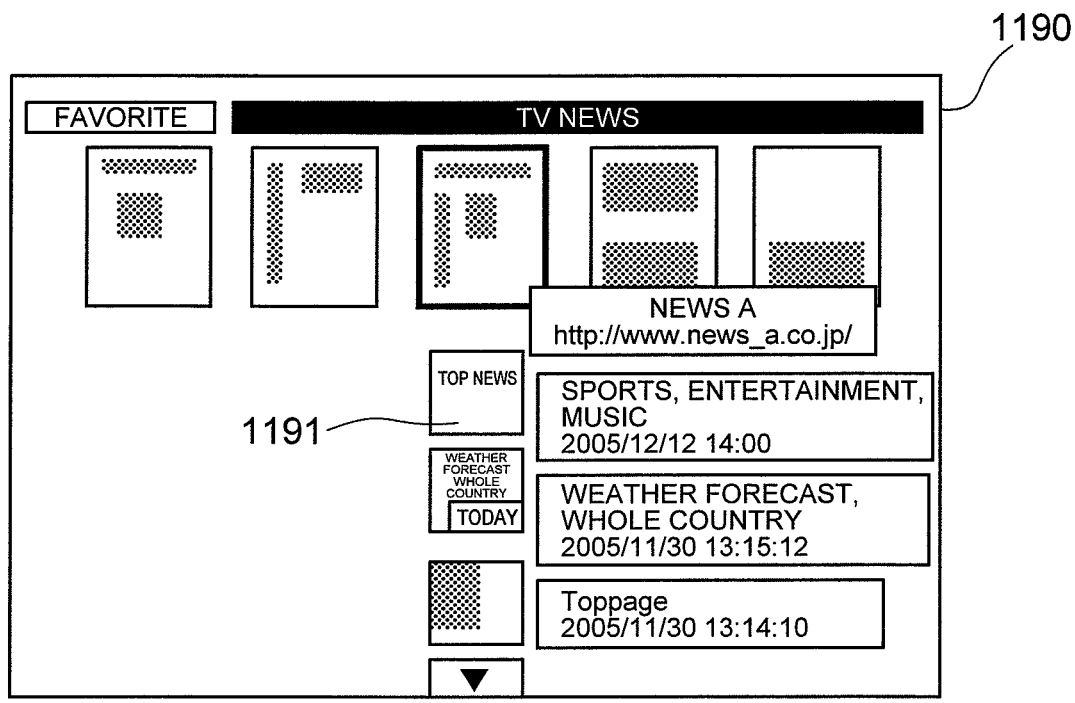
FIG. 19 is an explanatory view showing one example of a bookmark screen.
Figure 20:
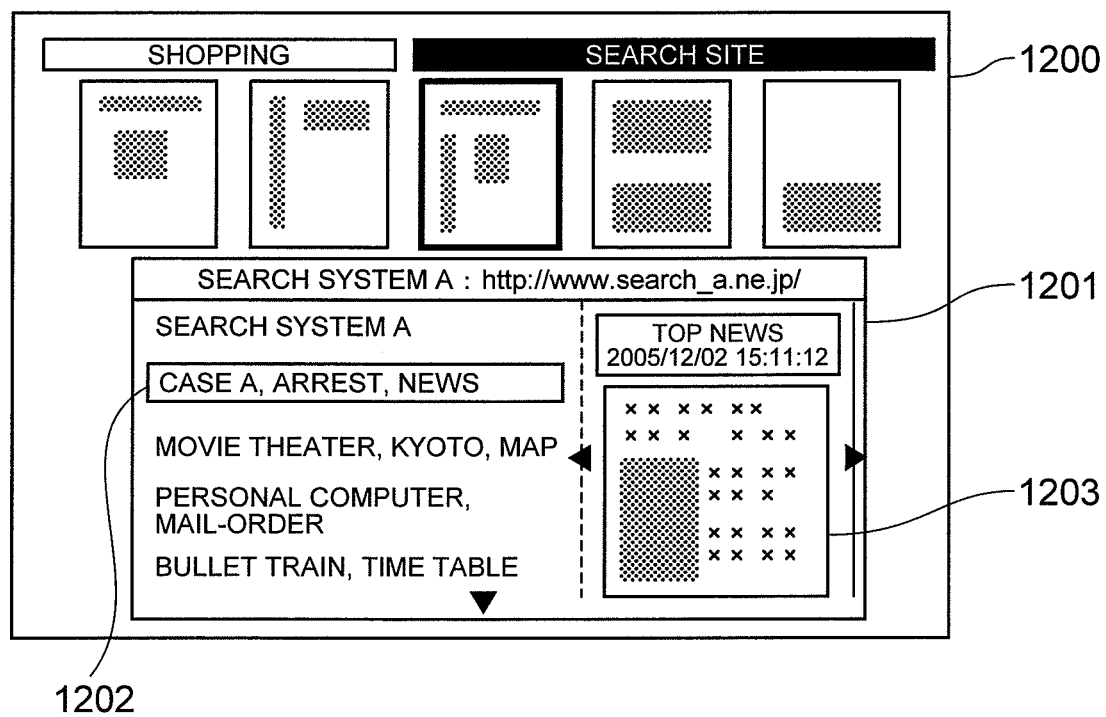
FIG. 20 is an explanatory view showing one example of a bookmark screen.
Figure 21:
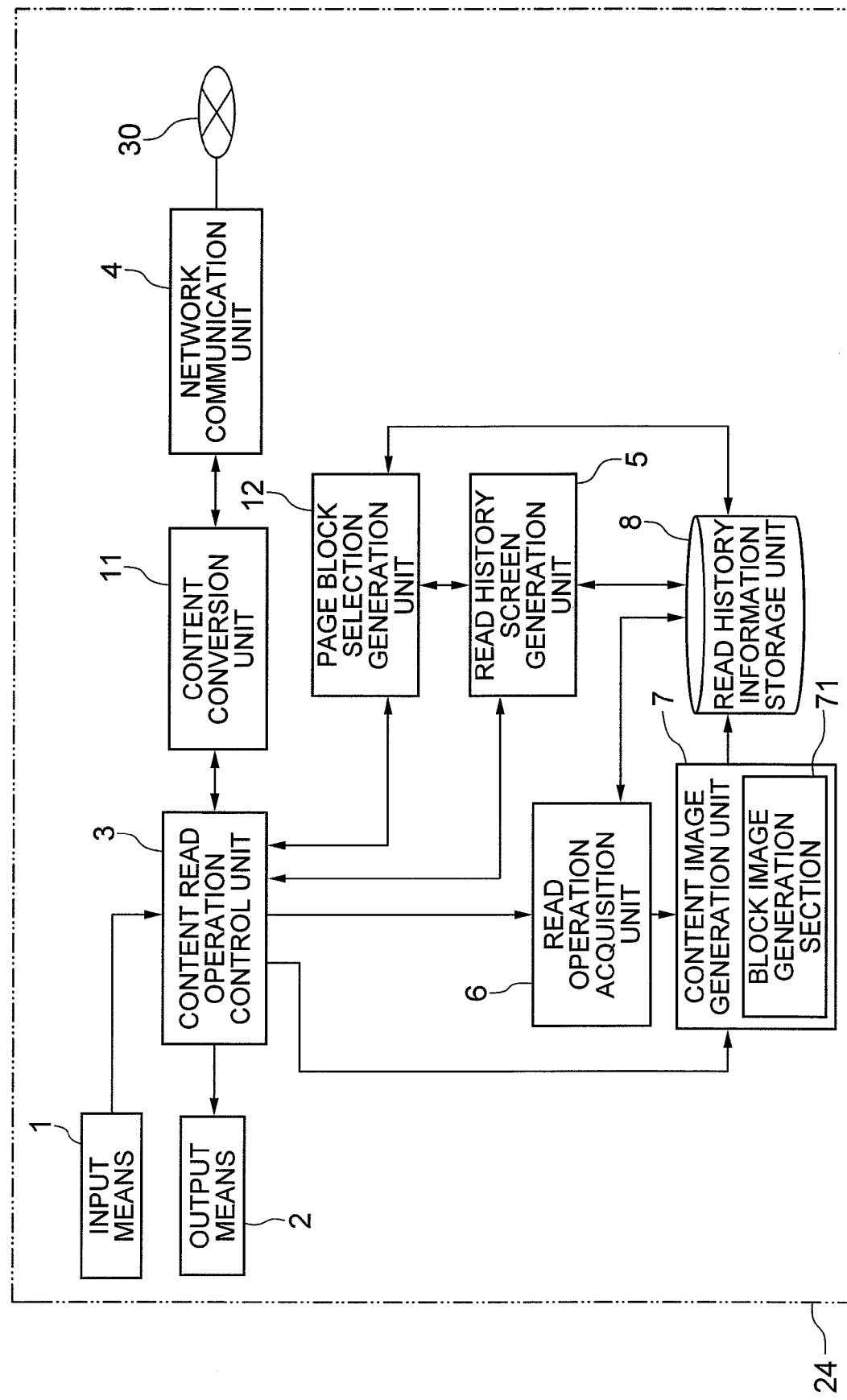
FIG. 21 is a configuration view showing one example of a configuration of a Web content read information display device according to a fifth exemplary embodiment of the present invention.
Figure 22:
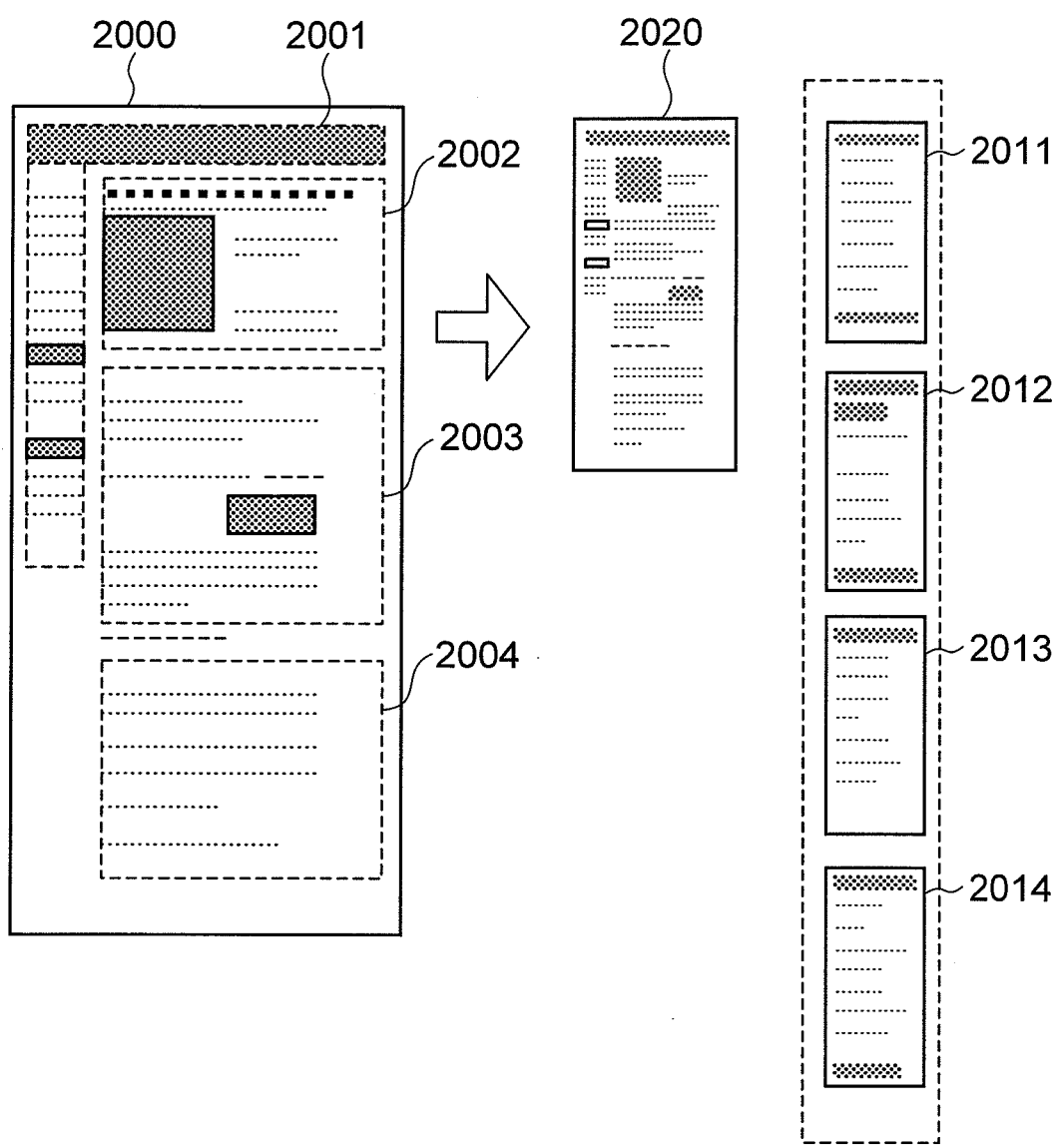
FIG. 22 is an explanatory view showing one example of a conversion process of a PC Web content.
Figure 23:
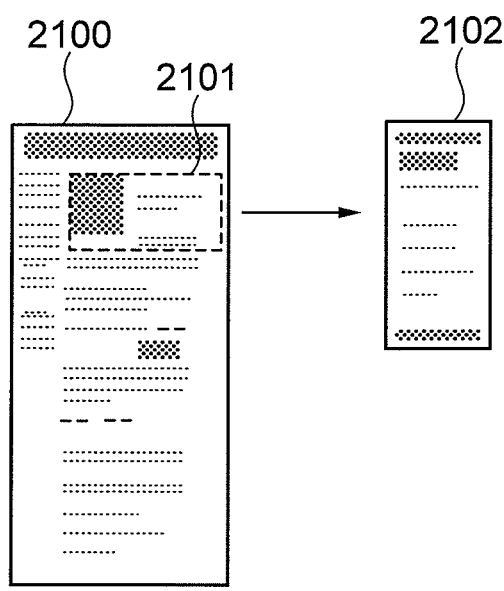
FIG. 23 is an explanatory view showing one example of a Web content where the PC Web content is performed with the conversion process.
Figure 24:
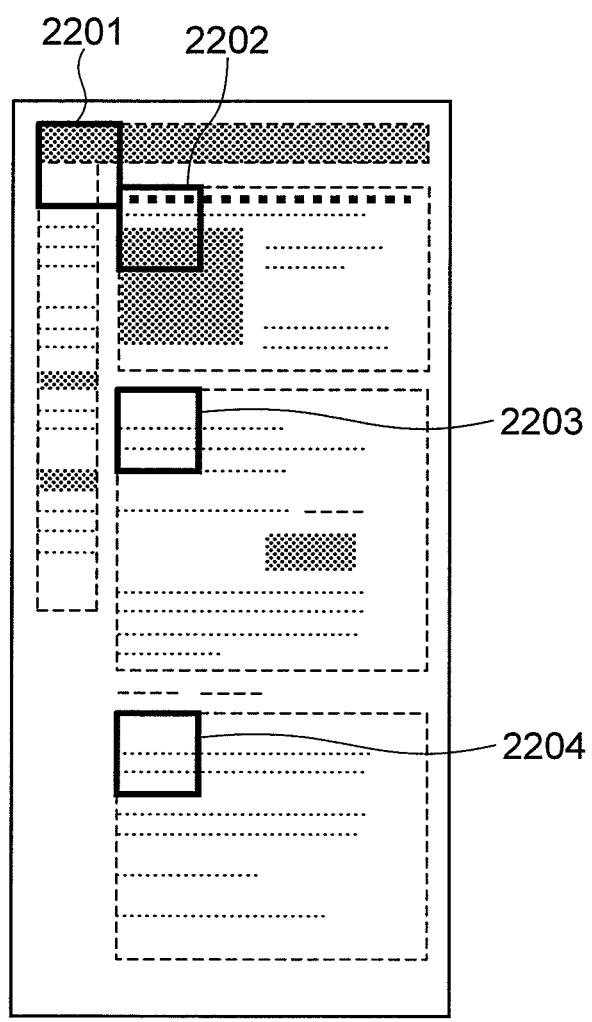
FIG. 24 is an explanatory view showing one example of a Web content image generation process.
Figure 25:
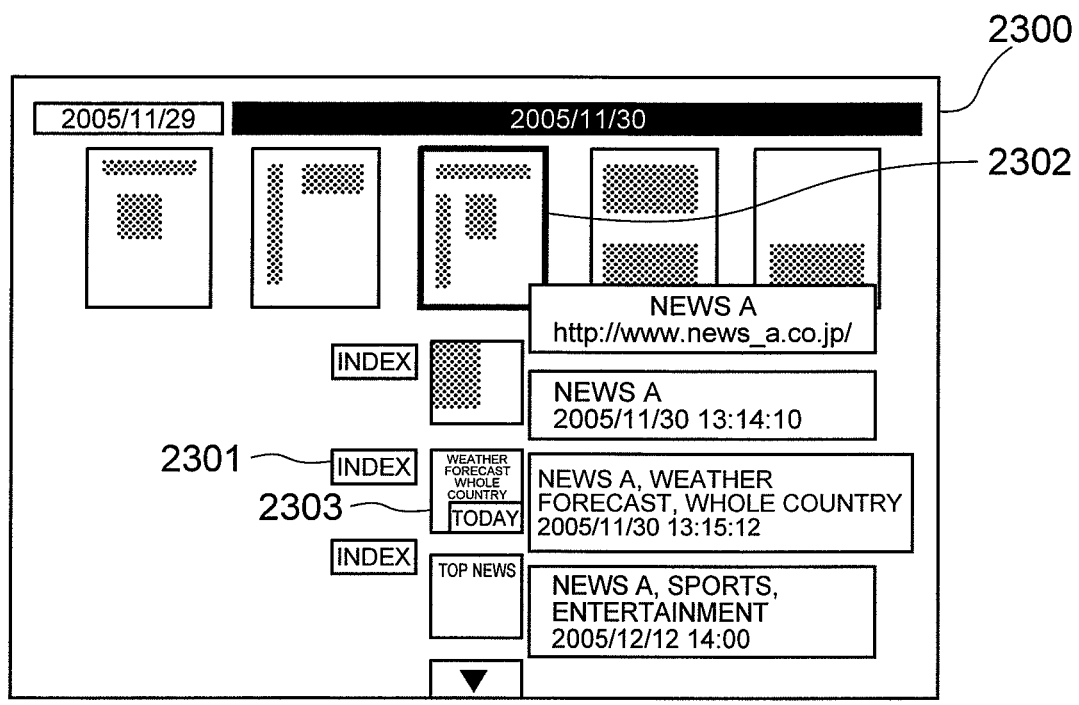
FIG. 25 is an explanatory view showing one example of a read history screen.
Figure 26:
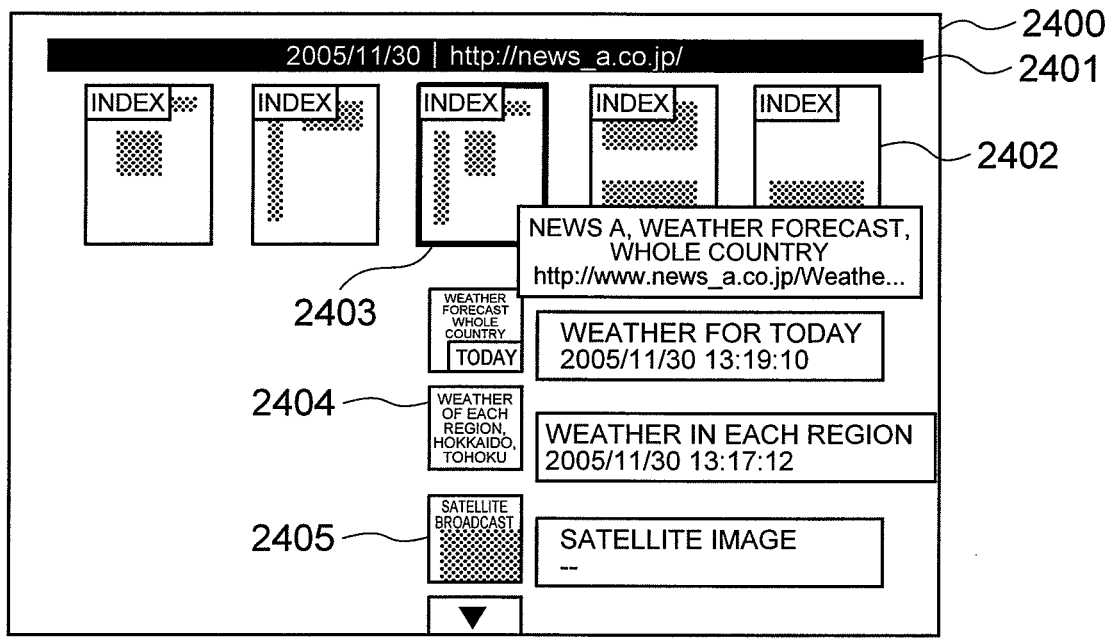
FIG. 26 is an explanatory view showing one example of a page block selection screen.
Figure 27:
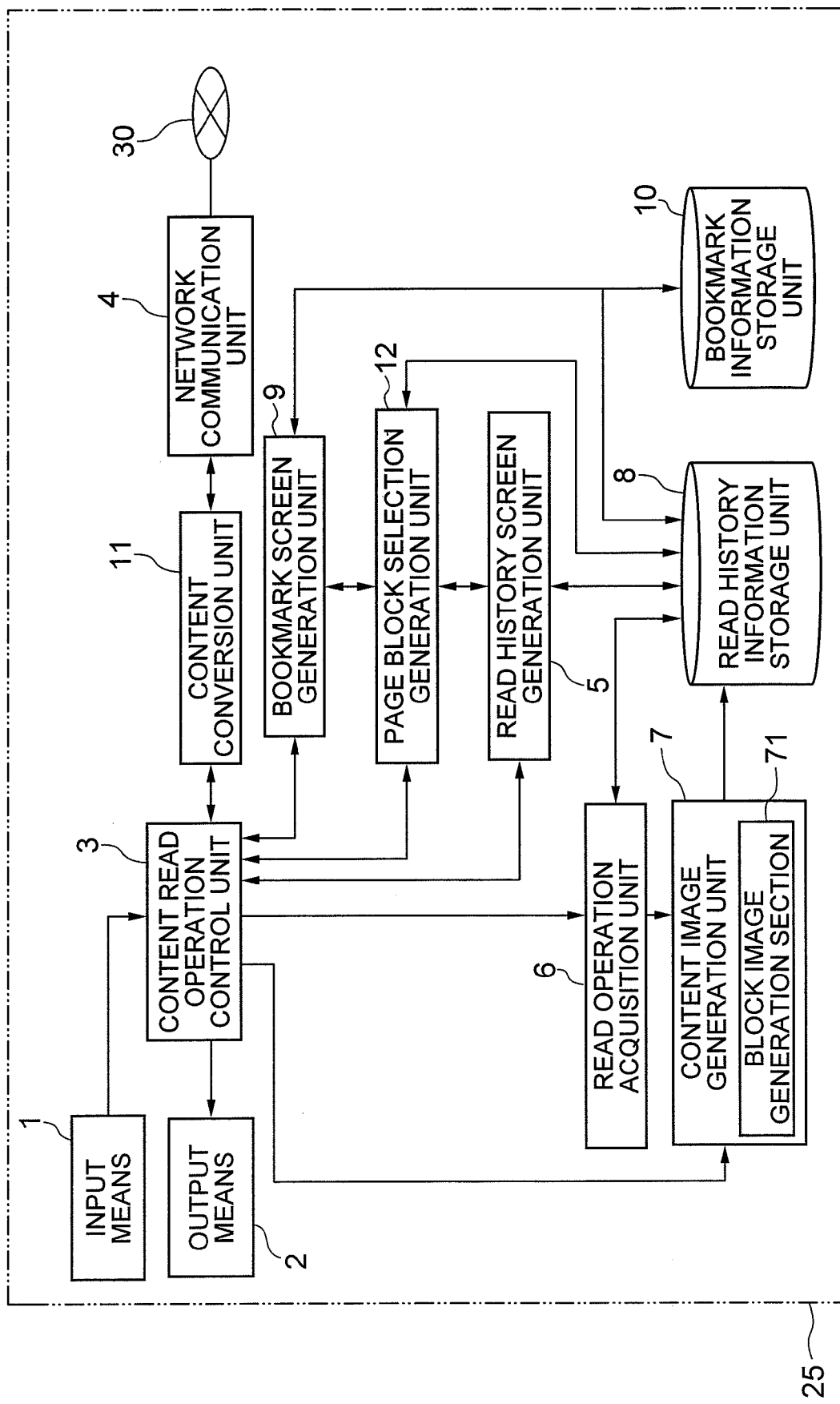
FIG. 27 is a configuration view showing one example of a configuration of a Web content read information display device according to a sixth exemplary embodiment of the present invention.
Figure 28:
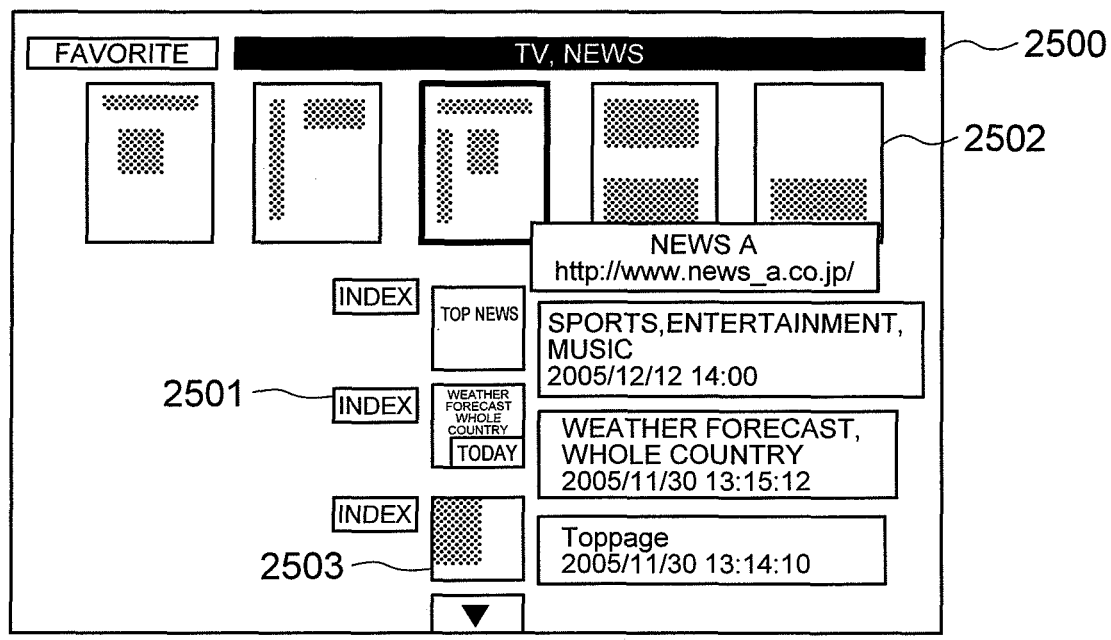
FIG. 28 is an explanatory view showing one example of a read history screen.
Figure 29:
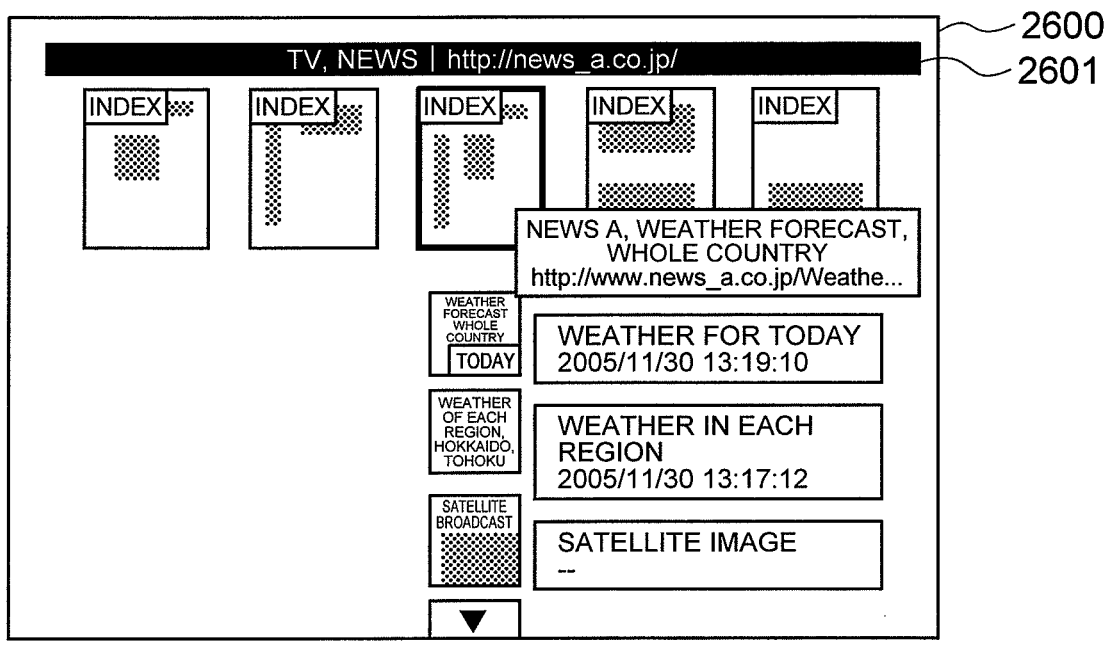
FIG. 29 is an explanatory view showing one example of a page block selection screen.

DESCRIPTION OF SYMBOLS 1 input device
2 output device
3 content read operation control unit
4 network communication unit
5 read history screen generation unit
6 read operation acquisition unit
7 content image generation unit
8 read history information storage unit
9 bookmark screen generation unit
10 bookmark information storage unit
11 content conversion unit
12 page block selection generation unit
20, 21, 22, 23, 24, 25 Web content read information display device
30 Internet
51 title correcting section
52 read path selection generation section
61 layout analyzing section
71 block image generation section

The invention claimed is:

1. A Web content read information display device comprising:
    a content image generation unit which generates:
        a thumbnail image which shows an overview of each area read by a user in the Web content, and
        a trimming image which is a part of an area in the Web content, the part of the area being read by the user a longest amount of time, the trimming image being cut out without reducing the size;
    a read history screen generation unit which generates a read history screen containing the thumbnail image and containing the trimming image; and
    a content read operation control unit which responds to a read operation that specifies the trimming image by displaying the Web content corresponding to the the trimming image.

2. The Web content read information display device according to claim 1, wherein the content image generation unit analyzes a layout configuration of the Web content, divides the Web content into a plurality of blocks, and corrects a region from which the thumbnail image and the trimming image are to be cut out according to a boundary of each block.

3. The Web content read information display device according to claim 1, wherein the read history screen generation unit generates an omitted title in which a portion common to titles of the Web contents belonging to a same group is omitted, and arranges the omitted title in the read history screen.

4. The Web content read information display device according to claim 1, wherein the read history screen generation unit display the Web content corresponding to the read operation information according to a past read path by arranging the title, an icon image, the thumbnail image, or the trimming image indicating the Web content on a read path on the read history screen.

5. The Web content read information display device according to claim 1, wherein the read history screen generation unit arranges a title or a thumbnail image of the Web content registered in a bookmark on the read history screen, where if a Web content corresponding to the selected one had been read in the past, the title, the thumbnail image, or the trimming image of a Web content belonging to the group same as the Web content is arranged on the read history screen.

6. The Web content read information display device according to claim 1, wherein
    the content image generation unit generates, from an index page indicating a list of divided pages obtained by dividing a converted content of the Web content into a plurality of pages, a converted thumbnail image, a converted trimming image, and a block image in which a portion including a region corresponding to each divided page in the index page is cut out according to a correspondence relationship of the index page and the divided page;

the content read operation control unit arranges the converted thumbnail image, the converted trimming image, and information indicating that the trimming image is an image generated from the converted Web content on the read history screen in place of the thumbnail image and the trimming image, and displays a block selection screen where the converted thumbnail image corresponding to the read operation information and the block image corresponding to the converted thumbnail image are arranged on the display device; and the read operation control unit displays the divided page corresponding to the block image selected in the block selection screen on the display device.

7. The Web content read information display device according to claim 6, wherein the content image generation unit acquires the converted content from an external device via a network.

8. A Web content read information display device comprising:
content image generation means for generating:
a thumbnail image which shows an overview of each area read by a user in the Web content, and
a trimming image which is a part of an area in the Web content, the part of the area being read by the user a longest amount of time, the trimming image being cut out without reducing the size;
read history screen generation means for generating a read history screen containing the thumbnail image and containing the trimming image; and
content read operation control means for displaying a Web content, corresponding to an image, in response to a read operation that specifies the trimming image.

9. A Web content read information display method for displaying externally input Web contents on a display device; the Web content read information display method comprising:
generating a thumbnail image, which shows an overview of each area read by a user in the Web content, and a trimming image, which is a part of an area in the Web content, the part of the area being read by the user a longest amount of time, the trimming image being cut out without reducing the size;
generating a read history screen containing the thumbnail image and containing the trimming image; and
displaying a Web content, corresponding to an image, in response to a read operation that specifies the trimming image.

10. The Web content read information display method according to claim 9, wherein at generating the thumbnail image and the trimming image, a layout configuration of the Web content is analyzed, the Web content is divided into a plurality of blocks, and a region from which the thumbnail image and the trimming image are cut out is corrected according to a boundary of each block.

11. The Web content read information display method according to claim 9, wherein at generating the read history screen containing the thumbnail image and the trimming image, an omitted title in which a portion common to titles of the Web contents belonging to a same group is omitted is generated, and the omitted title is arranged in the read history screen.

12. The Web content read information display method according to claim 9, wherein at generating the read history screen containing the thumbnail image and the trimming image, the Web content corresponding to the read operation information is displayed according to a past read path by arranging the title, an icon image, the thumbnail image, or the trimming image indicating the Web content on a read path on the read history screen.

13. The Web content read information display method according to claim 9, wherein the read history screen generation unit arranges a title or a thumbnail image of the Web content registered in a bookmark on the read history screen, where if a Web content corresponding to the selected one had been read in the past, the title, the thumbnail image, or the trimming image of a Web content belonging to the group same as the Web content is arranged on the read history screen.

14. The Web content read information display method according to claim 9, wherein
at generating the thumbnail image and the trimming image, from an index page indicating a list of divided pages obtained by dividing a converted content of the Web content into a plurality of pages, a converted thumbnail image, a converted thumbnail image, a converted trimming image, and a block image in which a portion including a region corresponding to each divided page in the index page is cut out according to a correspondence relationship of the index page and the divided page are generated;
at displaying the Web content corresponding to the image which is specified according to the read operation specifying one of the thumbnail image and the trimming image, on the display device, the converted thumbnail image, the converted trimming image, and information indicating that the trimming image is an image generated from the converted Web content are arranged on the read history screen in place of the thumbnail image and the trimming image, and a block selection screen where the converted thumbnail image corresponding to the read operation information and the block image corresponding to the converted thumbnail image are arranged is displayed on the display device; and
at generating the read history screen containing the thumbnail image and the trimming image, the divided page corresponding to the block image selected in the block selection screen is displayed on the display device.

15. The Web content read information display method according to claim 14, wherein at generating the thumbnail image and the trimming image, the converted content is acquired from an external device via a network.

16. A non-transitory computer readable recording medium storing a Web content read information display program operative to enable a computer execute:
content image generation processing which generates a thumbnail image which shows an overview of each area read by a user in the Web content, and generates a trimming image which is a part of an area in the Web content, the part of the area being read by the user a longest amount of time, the trimming image being cut out without reducing the size;
read history screen generation processing which generates a read history screen containing the thumbnail image and the trimming image; and
content read operation control processing which displays a Web content, corresponding to an image, in response to a read operation that specifies the trimming image.

17. The non-transitory computer readable recording medium according to claim 16, wherein in the content image generation processing, a layout configuration of the Web content is analyzed, the Web content is divided into a plurality of blocks, and a region from which the thumbnail image and the trimming image are cut out is corrected according to a boundary of each block.

18. The non-transitory computer readable recording medium according to claim 16, wherein in the read history screen generation processing, an omitted title in which a portion common to titles of the Web contents belonging to a same group is omitted is generated, and the omitted title is arranged in the read history screen.

19. The non-transitory computer readable recording medium according to claim 16, wherein in the read history screen generation processing, the Web content corresponding to the read operation information is displayed according to a past read path by arranging the title, an icon image, the thumbnail image, or the trimming image indicating the Web content on a read path on the read history screen.

20. The non-transitory computer readable recording medium according to claim 16, wherein in the read history screen generation process, a title or a thumbnail image of the Web content registered in a bookmark is arranged on the read history screen, where if a Web content corresponding to the selected one had been read in the past, the title, the thumbnail image, or the trimming image of the Web content belonging to the group same as the Web content is arranged on the read history screen.

21. The non-transitory computer readable recording medium according to claim 16, wherein
in the content image generation processing, from an index page indicating a list of divided pages obtained by dividing a converted content of the Web content into a plurality of pages, a converted thumbnail image, a converted trimming image, and a block image in which a portion including a region corresponding to each divided page in the index page is cut out according to a correspondence relationship of the index page and the divided page are generated;
in the content read operation control processing, the converted thumbnail image, the converted trimming image, and information indicating that the trimming image is an image generated from the converted Web content are arranged on the read history screen in place of the thumbnail image and the trimming image, and a block selection screen where the converted thumbnail image corresponding to the read operation information and the block image corresponding to the converted thumbnail image are arranged is displayed on the display device; and
in the read operation control processing, the divided page corresponding to the block image selected in the block selection screen is displayed on the display device.

22. The non-transitory computer readable recording medium according to claim 21, wherein in the content image generation processing, the converted content is acquired from an external device via a network.

* * * * *